(12) United States Patent　　(10) Patent No.:　US 12,580,515 B2

Bunker, III　　(45) Date of Patent:　*Mar. 17, 2026

(54) SKYLIGHT WITH INTEGRATED SOLAR PANEL

(71) Applicant: INNOVATIONS MANUFACTURING, INC., Denver, CO (US)

(72) Inventor: Owen Woodruff Bunker, III, Denver, CO (US)

(73) Assignee: Innovations Manufacturing, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,804

(22) Filed: Jul. 24, 2023

(65) Prior Publication Data

US 2025/0233544 A1　　Jul. 17, 2025

Related U.S. Application Data

(63) Continuation of application No. 17/061,244, filed on Oct. 1, 2020, now Pat. No. 12,034,399.

(60) Provisional application No. 62/908,866, filed on Oct. 1, 2019.

(51) Int. Cl.

| | |
|---|---|
| *H02S 20/23* | (2014.01) |
| *E04D 13/03* | (2006.01) |
| *F21V 33/00* | (2006.01) |
| *H02S 30/10* | (2014.01) |
| *H02S 40/32* | (2014.01) |
| *H02S 40/38* | (2014.01) |

(52) U.S. Cl.
CPC .......... *H02S 20/23* (2014.12); *E04D 13/0315* (2013.01); *F21V 33/006* (2013.01); *H02S 30/10* (2014.12); *H02S 40/32* (2014.12); *H02S 40/38* (2014.12)

(58) Field of Classification Search
CPC .............. E04D 13/031; E04D 13/0305; E04D 13/0315; F21V 33/006; H02S 20/23; H02S 20/26; H02S 30/10; H02S 40/32; H02S 40/38; Y02E 10/50
See application file for complete search history.

(56) References Cited

U.S. PATENT DOCUMENTS

| | | | | |
|---|---|---|---|---|
| 5,493,824 A | * | 2/1996 | Webster | ................ E04D 13/035 |
| | | | | 52/200 |
| 5,729,387 A | * | 3/1998 | Takahashi | ............... F24S 23/00 |
| | | | | 359/591 |
| 8,068,282 B1 | * | 11/2011 | Kastner | ................. E04D 13/033 |
| | | | | 359/591 |
| 9,897,289 B2 | * | 2/2018 | Biron | ....................... F21V 11/04 |
| 10,519,665 B2 | * | 12/2019 | Bunker, II | ............ E04D 13/031 |
| 2009/0277500 A1 | * | 11/2009 | Wong | .................... H10F 77/337 |
| | | | | 136/256 |
| 2011/0228520 A1 | * | 9/2011 | Cumberland | ......... F21S 19/005 |
| | | | | 362/183 |
| 2012/0087113 A1 | * | 4/2012 | McClellan | .......... F21V 23/0435 |
| | | | | 362/147 |

(Continued)

*Primary Examiner* — Jessie T Fonseca

(74) *Attorney, Agent, or Firm* — Kilpatrick Townsend & Stockton LLP

(57) ABSTRACT

A skylight includes a frame that is configured to be mounted to a structure, the frame defining a central opening and a solar power unit that is coupled with the frame.

20 Claims, 40 Drawing Sheets

(56)        References Cited

U.S. PATENT DOCUMENTS

2014/0238467 A1*  8/2014  Martin  ................... H10F 77/63
                                                                  136/246
2015/0162472 A1*  6/2015  Iyatani  ................. H10F 19/807
                                                                  438/66
2018/0291631 A1*  10/2018  Chirico  ................ E04D 13/033
2019/0257090 A1*  8/2019  Bunker, II  ........... E04D 13/031
2021/0091714 A1*  3/2021  Hammers  .............. H02S 20/26

* cited by examiner

SECTION
A-A

500

510 Cut Penetration

520 Shingle Roof Below Skylight

530 Dispose Skylight at Penetration

540 Shingle Sides of Skylight

550 Shingle Roof Above Skylight

560 Seal

570 Deform Horizontal Members

1302

1300

SKYLIGHT WITH INTEGRATED SOLAR PANEL

CROSS-REFERENCE TO RELATED APPLICATIONS

This application is a continuation of U.S. patent application Ser. No. 17/061,244 by Owen Woodruff Bunker II, entitled "SKYLIGHT WITH INTEGRATED SOLAR PANEL," filed Oct. 1, 2020, which is claims priority to U.S. Provisional Patent Application No. 62/908,866 by Owen Woodruff Bunker II, entitled "SKYLIGHT WITH INTE-GRATED SOLAR PANEL," filed Oct. 1, 2019, the entire disclosures of which are hereby incorporated by reference, for all purposes, as if fully set forth herein.

BRIEF SUMMARY OF THE INVENTION

Embodiments of the present invention are directed to systems and methods for incorporating solar cells into skylights. These solar cells may be configured to gather sunlight to generate electricity that is used to power any number of components. As just one example, the electricity may be used to power a light source that is integrated into and/or otherwise electrically coupled with the skylight. In such a manner, a skylight may provide light to an interior of a structure during the day, but also at night when there is insufficient ambient light available to light the structure. In some embodiments, the power generated by the solar cells may be used to feed an outlet, trickle charger, and/or other equipment. This allows a structure, such as a shed, garage, cabin, or RV which is not wired to the electrical grid to still receive power to power equipment attached thereto or stored therein.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrange-ment among or between various steps or elements except when the order of individual steps or arrangement of ele-ments is explicitly described.

Embodiments of the present invention are directed to skylights that include integrated solar cells. These solar cells are usable to generate electricity that may be used to power one or more peripheral devices, such as lights, power outlets, batteries, trickle chargers, skylight motors, etc. The embodiments described herein integrate the solar panel and/or any wiring into the design of the skylight, eliminating the need to form holes within the roof of a structure on which the skylight is mounted. Additionally, in embodiments in which the skylight includes both a light source and an integrated solar panel, the skylights can provide light to an interior of a structure both during daylight (via the skylight) and darkness (via the solar-powered light source). Such skylights are particularly useful in structures that are not attached to an electrical grid such as storage sheds, recreational vehicles (RVs), cabins, garages, and the like. However, it will be appreciated that the skylights described herein may be utilized with any structure including houses, mobile homes, commercial buildings, etc.

Figure 1:
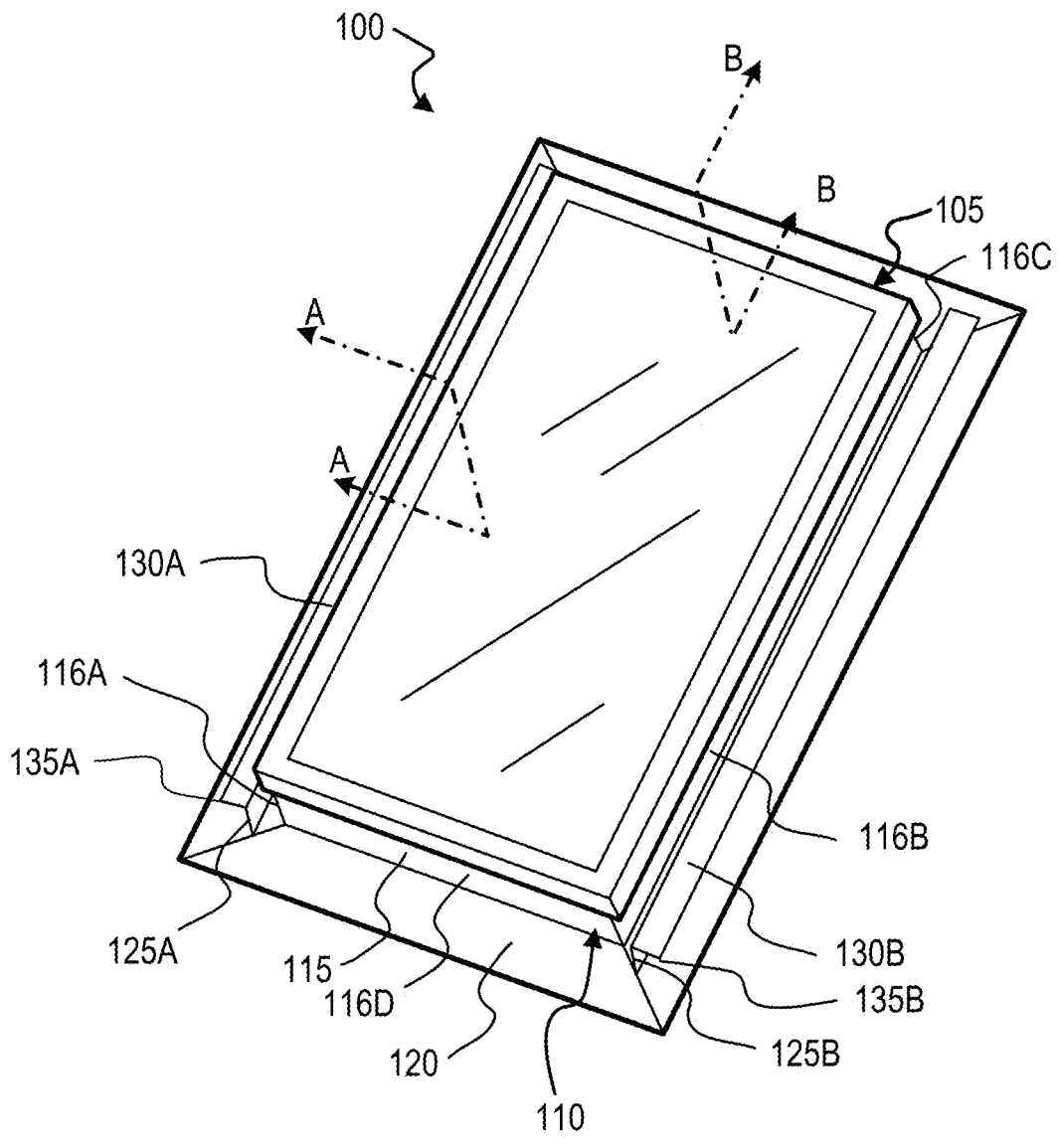
FIG. 1 is a perspective view of one skylight embodiment of the invention.
Figure 2:
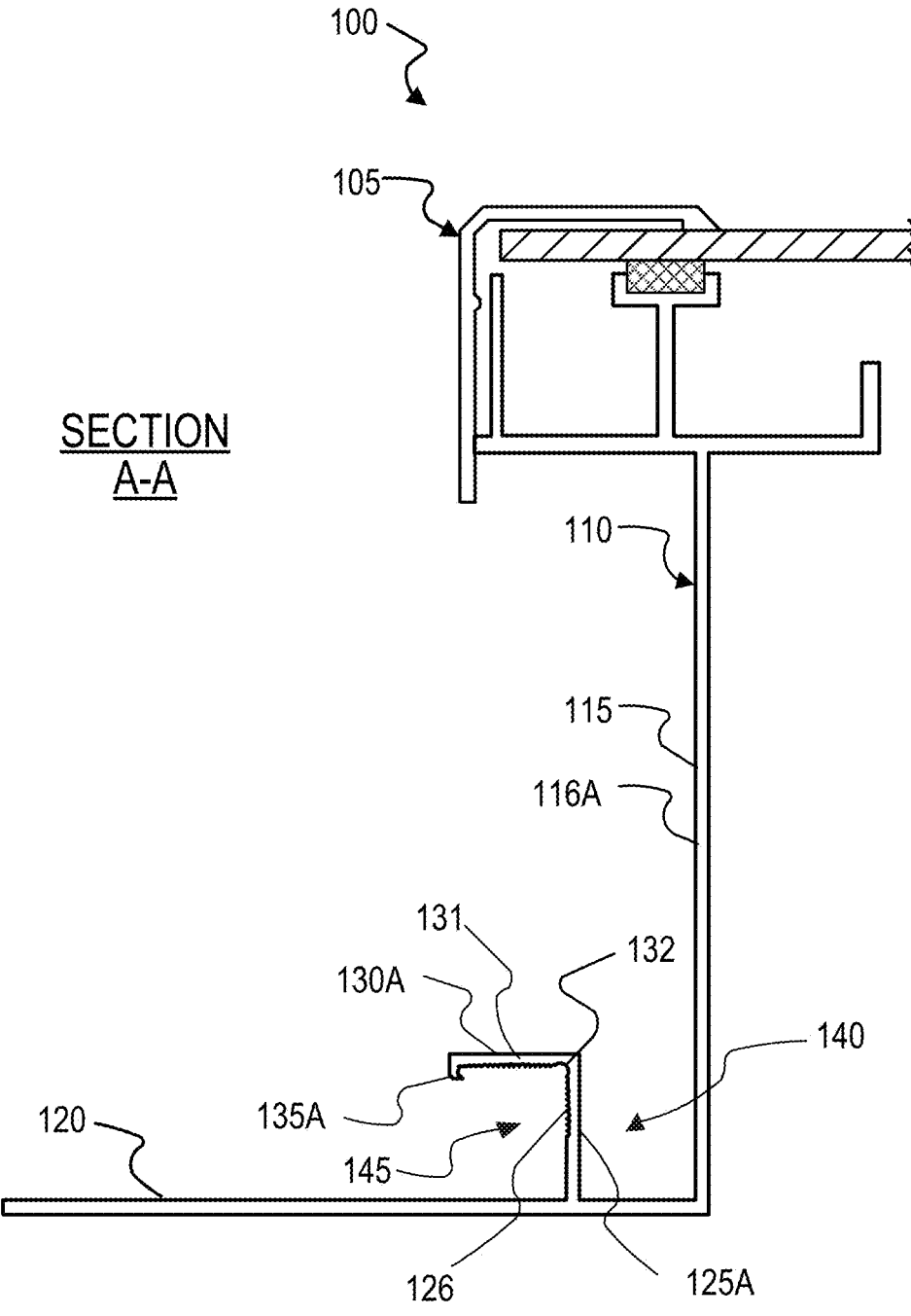
FIG. 2 is a first cross section of the skylight from FIG. 1.
Figure 3:
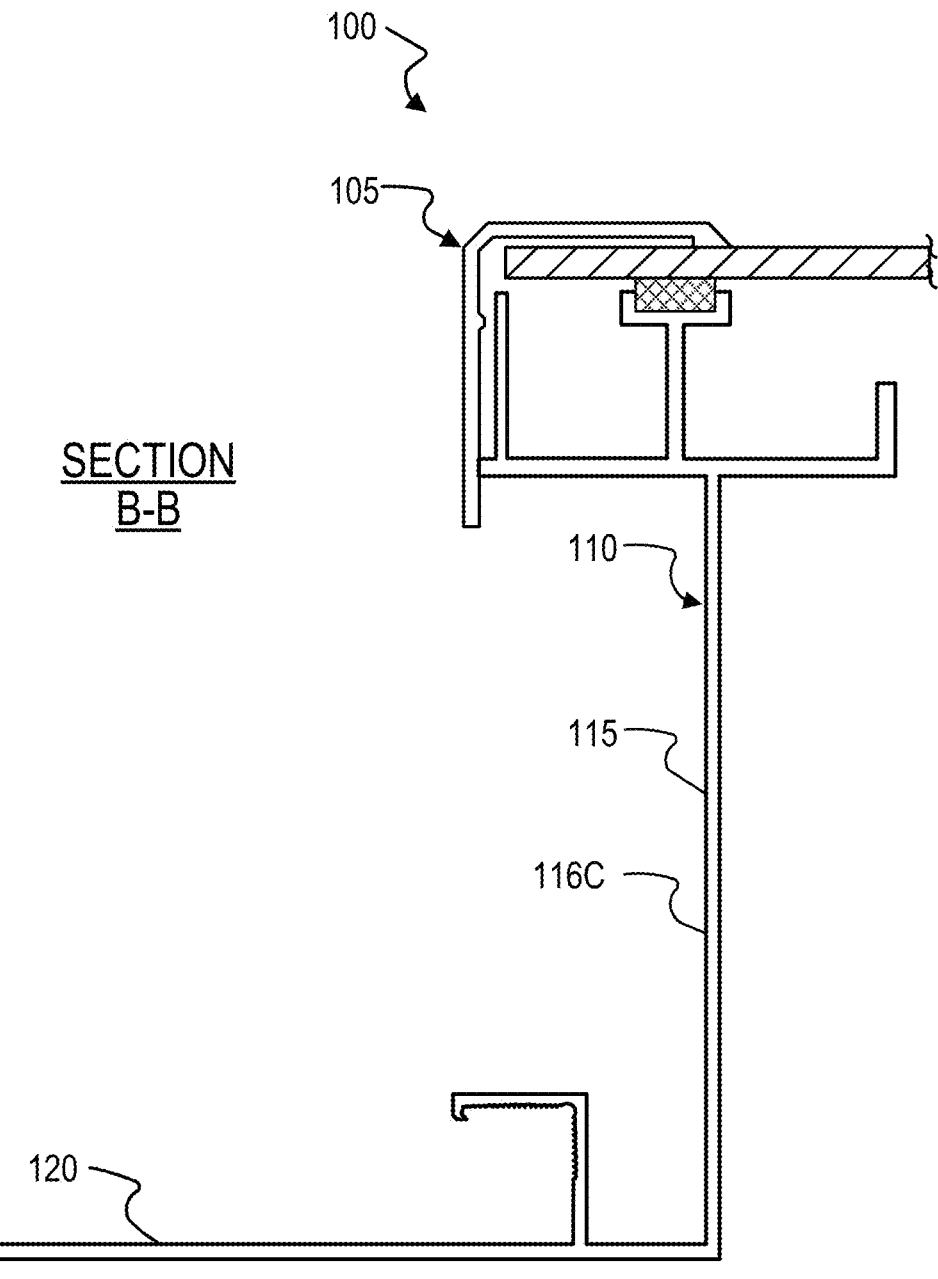
FIG. 3 is a second cross section of the skylight from FIG. 1.

In one embodiment, as shown in FIG. 1, a skylight 100 is provided. Skylight 100 may include a window assembly 105 and a frame 110 having a number of components. The components of frame 110 may include a vertical curb 115, horizontal flashing 120, a first vertical member 125A, a second vertical member 125B, a first horizontal member 130A, and a second horizontal member 130B. Some embodiments may also include a first vertical nub 135A and a second vertical nub 135B. FIG. 2 and FIG. 3 show cross sections A-A and B-B, respectively, of skylight 100. The components of frame 110 may be constructed of metal, polymer, or other suitable material.

Horizontal flashing 120 may be integral with, and extend away from, a bottom of each exterior side of vertical curb 115. By "integral with," a person of skill in the art should understand that the two components are of homogenous continuous construction, and form a single physical element. As shown in cross sections A-A and B-B, this also means that there is no interface between such components (horizontal flashing 120 and vertical curb 115). Having no interface between the two components (horizontal flashing 120 and vertical curb 115) at this location provides the advantage of removing an additional location that water may penetrate, that is perhaps present in prior art skylight frames. In some embodiments, horizontal flashing 120 may extend substantially orthogonally away from the bottom of each exterior side 116 of vertical curb 115. By "substantially orthogonal," a person of skill in the art should understand that an angle of 90 degrees, plus or minus two degrees, is intended.

First vertical member 125A may extend upward from horizontal flashing 120 which extends from a first exterior side 116A of vertical curb 115. In some embodiments, first vertical member 125A may be integral with horizontal flashing 120. First horizontal member 130A may extend from first vertical member 125A, and away from vertical curb 115. Likewise, on a second exterior side 116B, opposite first exterior side 116A, second vertical member 125B may extend upward from horizontal flashing 120 which extends from second exterior side 116B of vertical curb 115. In some embodiments, second vertical member 125B may be integral with horizontal flashing 120. Also similarly, second horizontal member 130B may extend from second vertical member 125B, and away from vertical curb 115. In some embodiments, first horizontal member 130A may be integral with first vertical member 125A, and second horizontal member 130B may be integral with second vertical member 125B.

In some embodiments, a bottom side of each horizontal member 130 may include a roughened, textured, or the like surface 131. Likewise, a portion of an outer side of each vertical member 125 may also include a roughened, textured, or the like surface 126. In some embodiments, as shown in FIG. 2, only a top portion of the outer side of each vertical member 125 may include the roughened, textures, or the like surface 126.

In some embodiments, first vertical nub 135A may extend downward from first horizontal member 130A at an opposite end of first horizontal member 130A from first vertical member 125A. Likewise, second vertical nub 135B may extend downward from second horizontal member 130B at an opposite end of second horizontal member 130B from second vertical member 125B. In some embodiments, first vertical nub 135A may be integral with first horizontal member 130A, and second vertical nub 135B may be integral with second horizontal member 130B. As shown in FIG. 2, vertical nubs 135 may be hook shaped.

Thus, as demonstrated in FIG. 2, a vertically-open channel 140 having an open top and a homogenous uninterrupted inner surface may be defined by each vertical member 125, horizontal flashing 120, and vertical curb 115. As also demonstrated in FIG. 2, a horizontally-open channel 145 having an open side and a homogenous uninterrupted inner surface may be defined by each horizontal member 130, each corresponding vertical member 125, and horizontal flashing 120.

In some embodiments, vertical members 125 may be substantially parallel with proximate/nearby exterior sides 116 of vertical curb 115. By "substantially parallel," a person of skill in the art should understand that parallel, plus or minus two degrees thereof, is intended. In some embodiments, horizontal flashing 120 may be substantially parallel with horizontal members 130. In some embodiments, vertical members 125 and exterior sides 116 of vertical curb 115 may be substantially orthogonal to horizontal flashing 120 and horizontal members 130.

In some embodiments, horizontal flashing 120 which extends from a third exterior side 116C of vertical curb 115 has no substantial features thereon. Third exterior side 116C of vertical curb 115 couples first exterior side 116A with second exterior side 116B. Likewise, in some embodiments, horizontal flashing 120 which extends from a fourth exterior side 116D of vertical curb 115 has no substantial features thereon. Fourth exterior side 116D of vertical curb 115 also couples first exterior side 116A with second exterior side 116B, but at the other end thereof.

In some embodiments, powered lights may be present on the interior of vertical curb 115 or some other interior portion of skylight 100. The lights may be powered by batteries, solar power, or hardwired external sources such as power from the associated structure.

Figure 4:
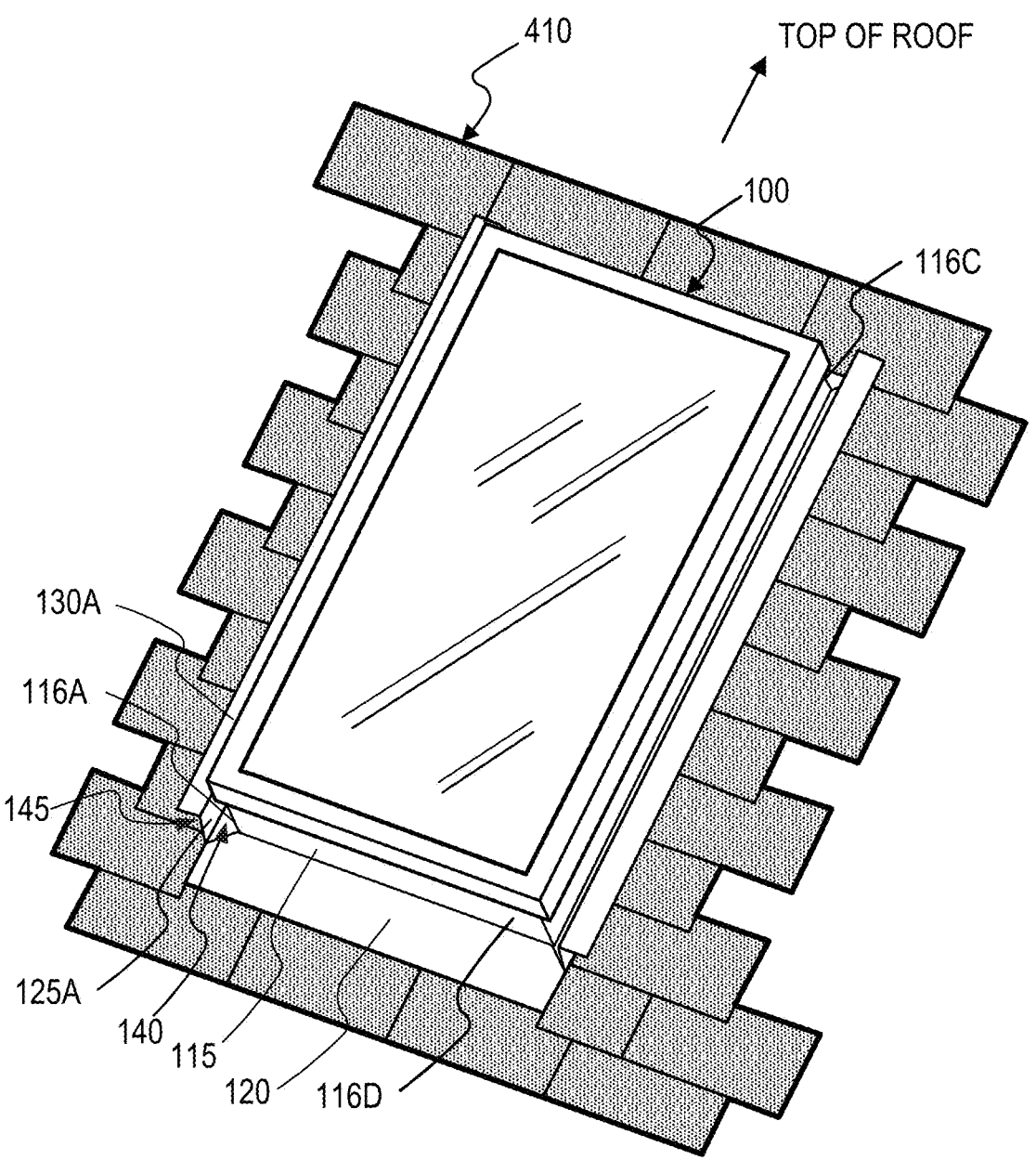
FIG. 4 is a perspective view of the skylight from FIG. 1, disposed on a roof with shingles.

FIG. 4 shows a perspective view of skylight 100 after installation on a roof. Skylight 100 has been disposed in a particular orientation on the roof so that third exterior side 116C is disposed at the top-most portion of the installation, while fourth exterior side 116D is located at the bottom-most portion of the installation. Shingles 410 have been disposed around skylight 100. Though only one layer of shingles 410 is shown, other construction materials, as well as additional layers of shingles 410 may also be present in some installations/embodiments.

Prior to disposing frame 110 of skylight 100 in this particular orientation on the roof, shingles 410 were disposed on the roof in the location that is underneath horizontal flashing 120 which extends from fourth exterior side 116D of vertical curb 115.

After disposing frame 110 of skylight 100 in the particular orientation on the roof, shingles 410 were disposed on the roof such that shingles 410 at least partially cover horizontal flashing 120 which extends from first exterior side 116A of vertical curb 115, and also such that shingles 410 abut first vertical member 125A underneath first horizontal member 130A. A sealant, mastic for example, may be disposed within horizontally-open channel 145 between shingles 410 and first horizontal member 130A, and grip to the surfaces of horizontally-open channel 145, including roughened, textured, or the like surfaces 126, 131 within said channel. In some embodiments, horizontal member 130 may be forced downward such that first nub 135A grips into shingles 410. Construction about the other side of skylight may be substantially similar, as shown in FIG. 4. An exaggerated sunken fillet 132, set into the inner-corner interface between vertical member 125 and horizontal member 130 may be present in order to ease the ability of horizontal member 130 to be forced/rotated downward.

Finally, to complete installation, after disposing frame 110 of skylight 100 in the particular orientation on the roof, shingles 410 may be disposed on the roof such that shingles 410 at least partially cover horizontal flashing 120 which extends from the third exterior side 116C of vertical curb 115.

As can now be seen, water flowing around skylight 100 from precipitation, etc. will proceed to flow around skylight 100, and flow down vertically-open channels 140, between vertical curb 115 and vertical members 125, avoiding the interface of shingles 410 to frame 110 which is located on the other side of vertical members 125. This contrasts to many prior art skylights where shingles may abut the vertical curb thereof directly, providing an interface between the shingles and the vertical curb for water to pass through damaging the roof and structure underneath.

Figure 5:
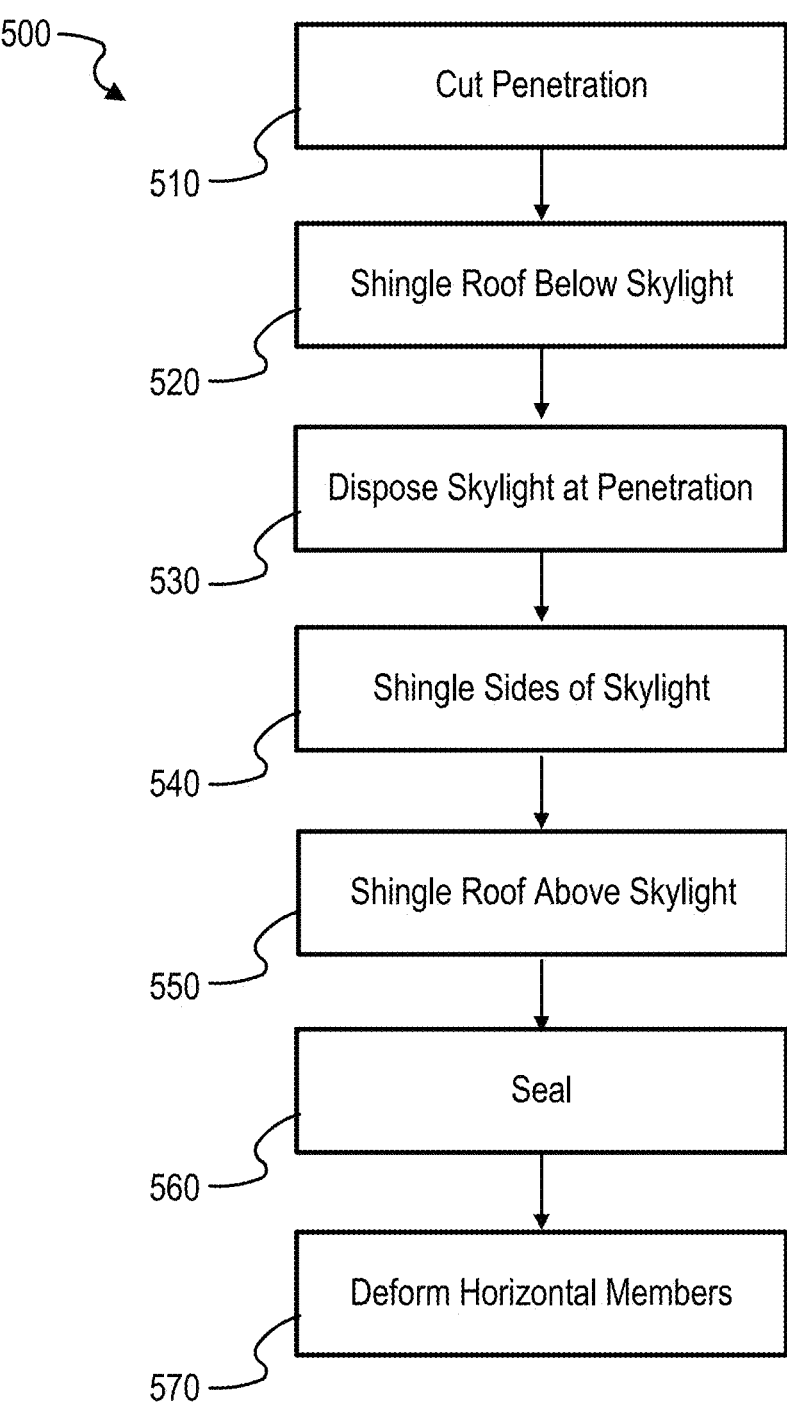
FIG. 5 is a flow diagram of one method embodiment of the invention for installing the skylight of FIG. 1.

FIG. 5 shows a block diagram of one method 500 of the invention for installing skylight 100. At block 510, a penetration (hole) is cut in the roof to the size appropriate for frame 110. At block 520, shingles 410 and other roofing materials are disposed on the roof below the penetration. At block 530, frame 110 is disposed over the penetration and shingles 410 already placed.

At block 540, shingles and other roofing materials are disposed on the sides of frame 110 such that they abut the outer face of vertical members 125. At block 550, shingles and other roofing materials are disposed over at least a portion of horizontal flashing 120 which extends from the top side of frame 110.

At block 560, a sealant is disposed in the space defined between shingles 410, vertical member 125, and horizontal members 130. Sealant may also be disposed at other locations where frame 110 interfaces with shingles 410. In some embodiments, at block 570, horizontal members 130 may be forced downward, potentially moving nubs 135 into shingles 410 and/or other roofing materials.

FIGS. 6A-6F illustrate an embodiment of a skylight 600 that may include an integrated solar power unit 602. Skylight 600 may be similar to skylight 100 described above and/or may have a completely different design. For example, as illustrated, skylight 600 may include a frame 604 that is usable to mount a skylight panel 606 onto a structure, such as a house, shed, RV, etc. While illustrated with a generally rectangular frame 604, it will be appreciated that the skylights used here may utilize any side and/or shape of frame 604. Skylight panel 606 may be formed of a transparent material, such as (but not limited to) glass, polycarbonate, and/or an acrylic material that allows light to enter an interior of a structure while preventing water, animals, and/or debris from entering the structure. While shown here with a domed skylight panel 606a, it will be appreciated that other shapes of skylight panels 606 may be used, such as flat skylight panel 606b, angled, and/or otherwise shaped skylight panels 606. The solar power unit 602 may include one or more solar panels, solar cells, power storage devices, inverters, and/or components used in solar power units.

In some embodiments, each side (or each side that is to be inclined with a slope of a roof structure) of the frame 604 may include a vertical curb 608 and/or vertical member 610 that define a vertically-open channel 612 having an open top and a homogenous uninterrupted inner surface that provides a drainage path for water, without allowing any of the water to get underneath the skylight 600 and/or any roofing shingles positioned adjacent the skylight 600.

Figure 6A:
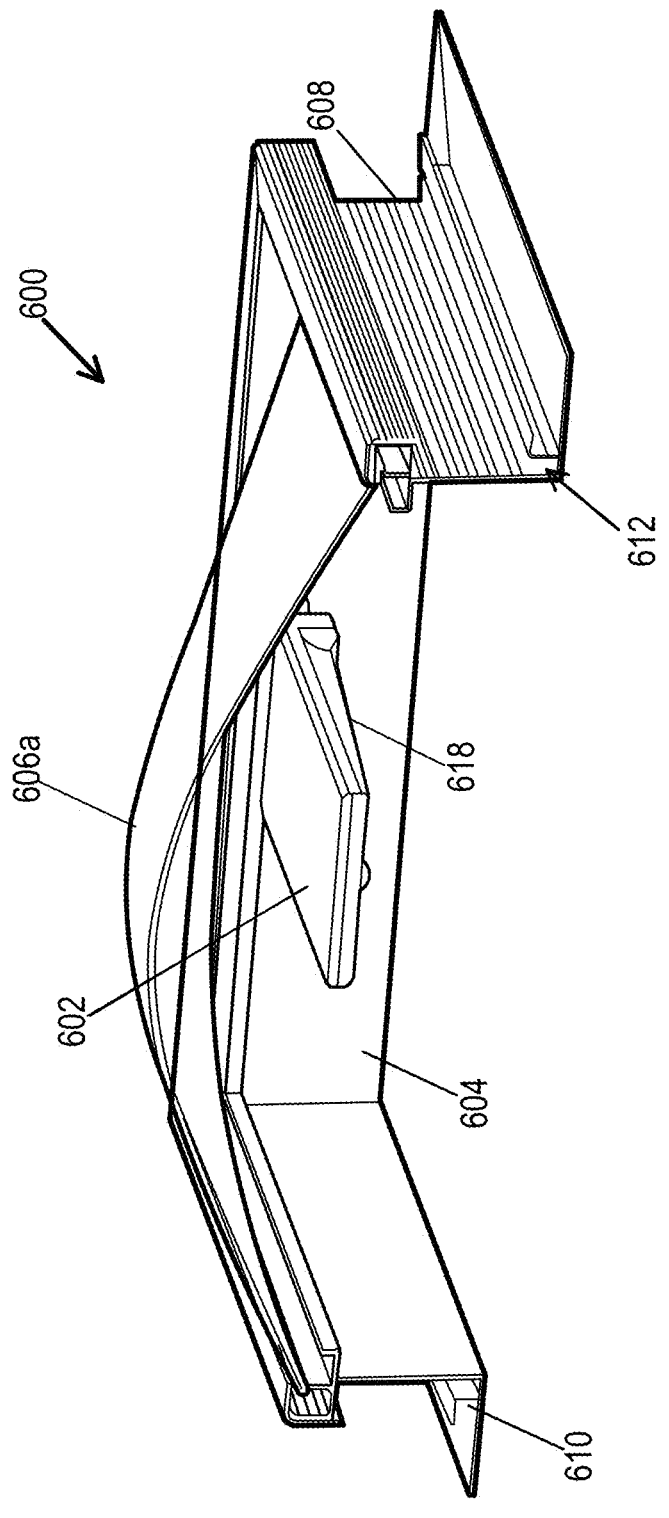
FIG. 6A is a cross section of a skylight with an integrated skylight.
Figure 6B:
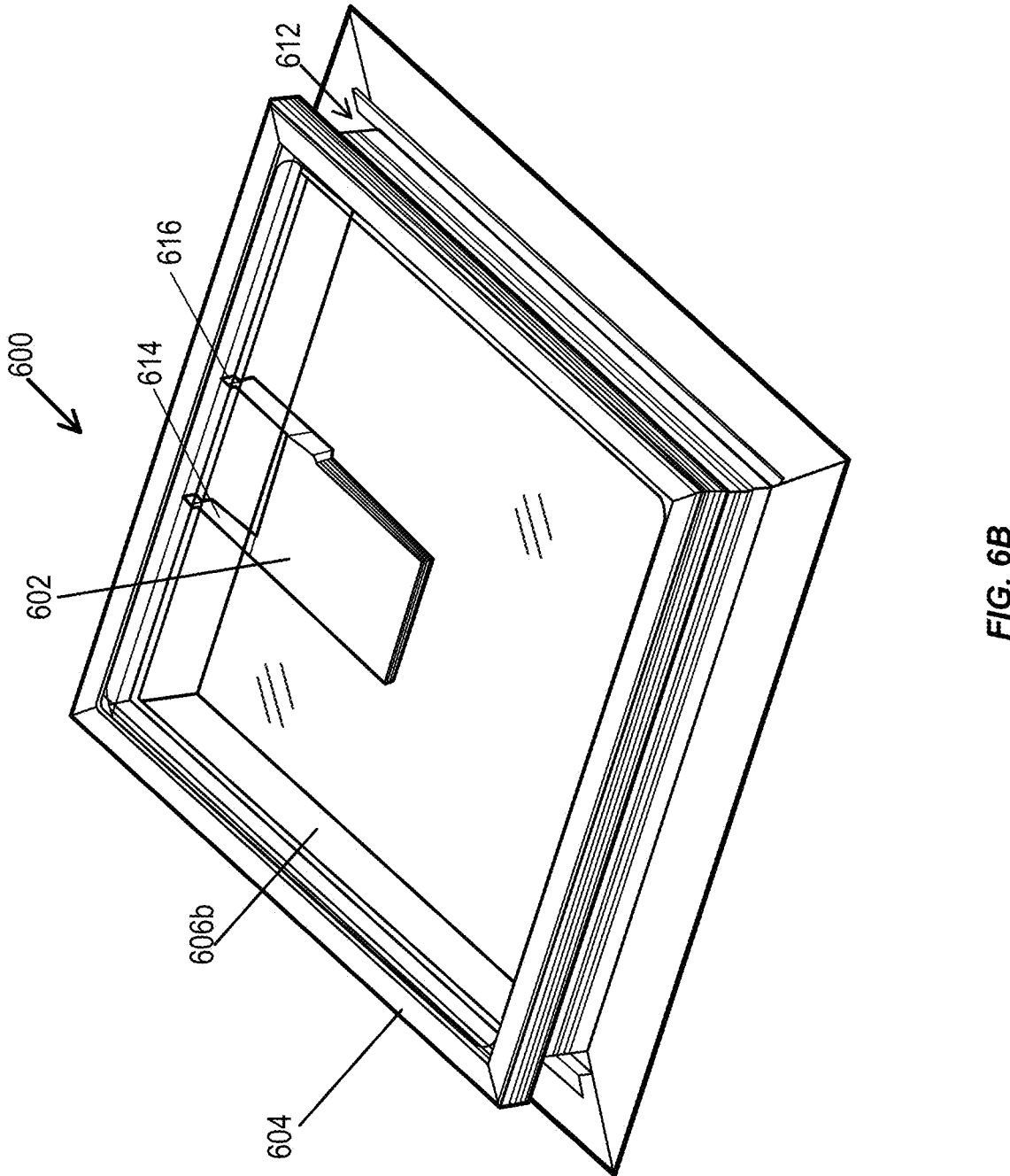
FIG. 6B is an isometric view of the skylight from FIG. 6B.

As shown here, the solar power unit 602 is mounted to an interior of the frame 604 and positioned underneath the skylight panel 606. Such a configuration places the solar power unit 602 in direct sunlight (with only the skylight panel 606 serving as an intervening component) while protecting the solar power unit 602 from the elements, such as hail, dust, dirt, etc. The solar power unit 602 may be mounted to the frame 604 using a bracket 614 and/or other mounting device. In some embodiments, the bracket 614 may be mounted permanently to the frame 604, such as by welding, fastening, and/or other securement techniques. In other embodiments, the bracket 614 may be removable from the frame 604. For example, the bracket 614 may be secured using a snap fit feature, magnets, and/or other removable fastening mechanism. In one particular embodiment, such as illustrated in FIG. 6B, the bracket 614 may include one or more hooks 616 that are usable to hang or otherwise mount the bracket 614 onto a portion of the frame 604. Such a configuration may allow the position of the solar power unit 602 about the frame 604 to be adjusted and/or removed for servicing, to adjust shadow position, and/or to accommodate additional solar power units 602. In some embodiments, rather than (or in addition to) the bracket 614 being removable from the frame 604, the solar power unit 602 may be removable from the bracket 614. For example, the bracket 614 and the solar power unit 602 may be coupled using removable connectors such as magnets and/or keyhole slot connectors.

Figure 6C:
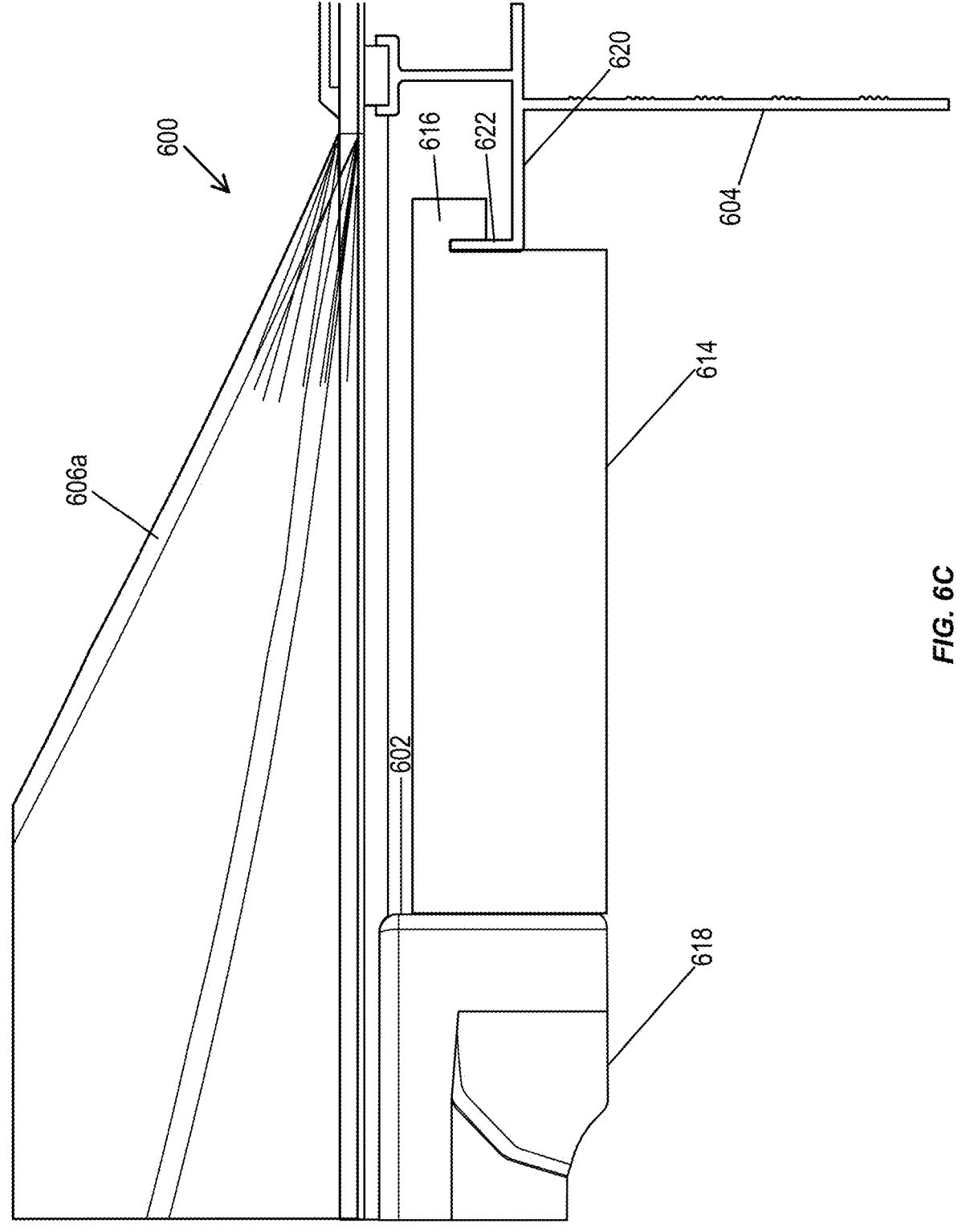
FIG. 6C is a partial side elevation cross-sectional view of the skylight from FIG. 6A.
Figure 6D:
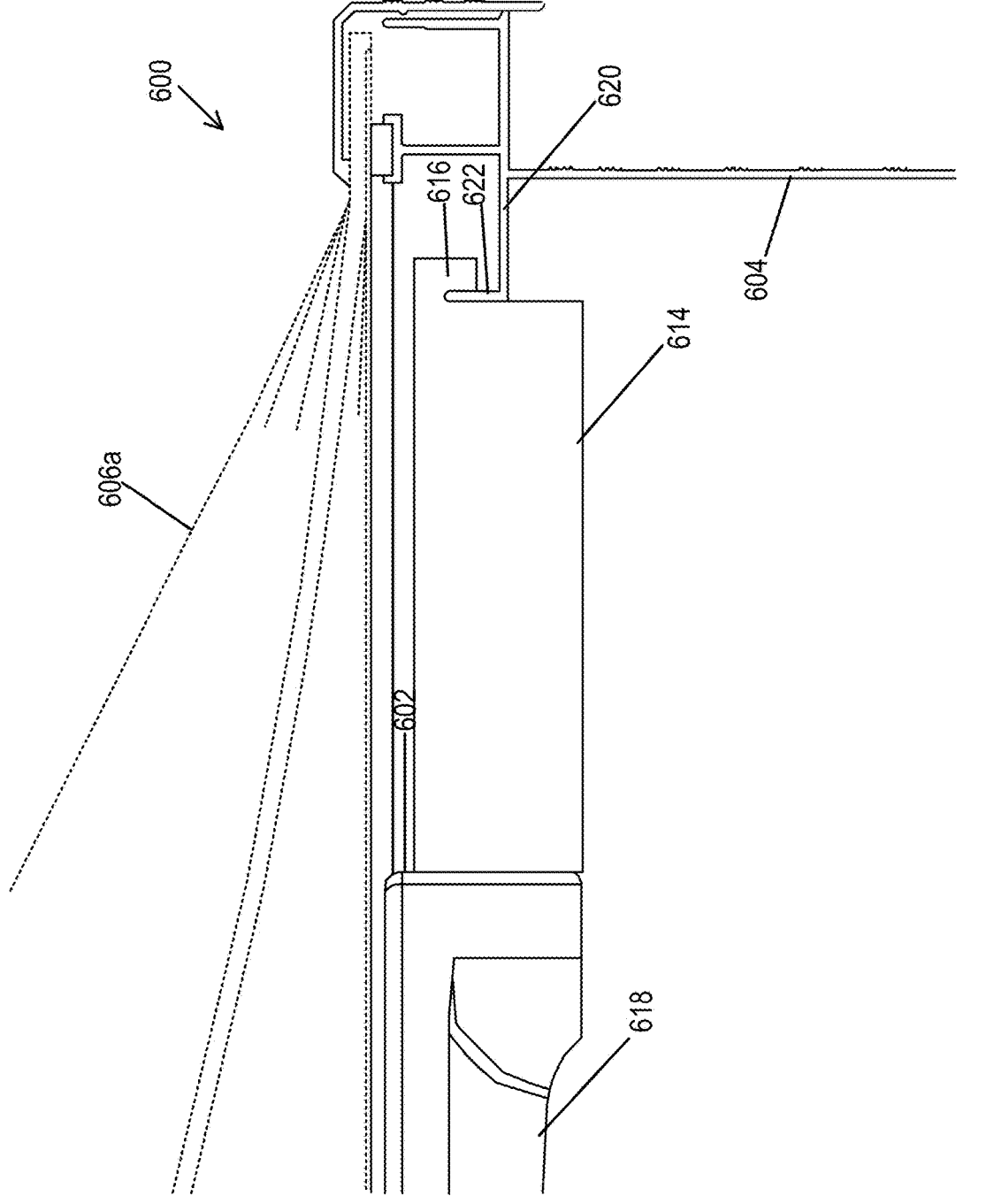
FIG. 6D is a partial front elevation cross-sectional view of the skylight from FIG. 6A.
Figure 6E:
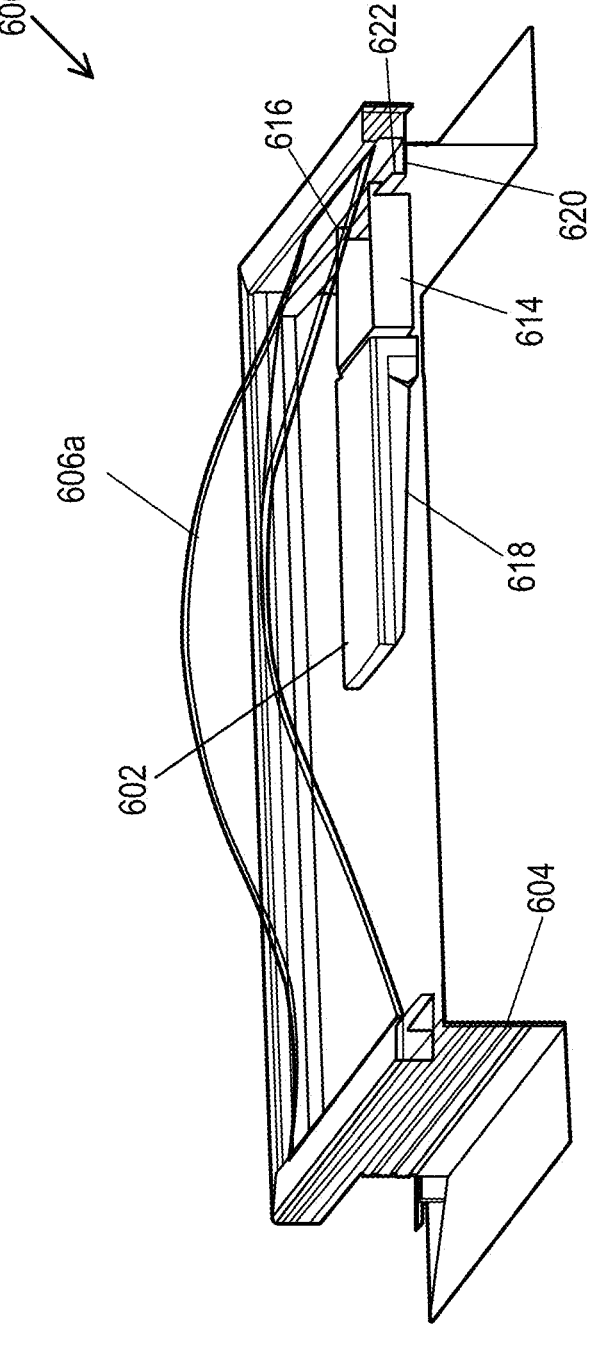
FIG. 6E is a cross-sectional view of the skylight from FIG. 6A.
Figure 6F:
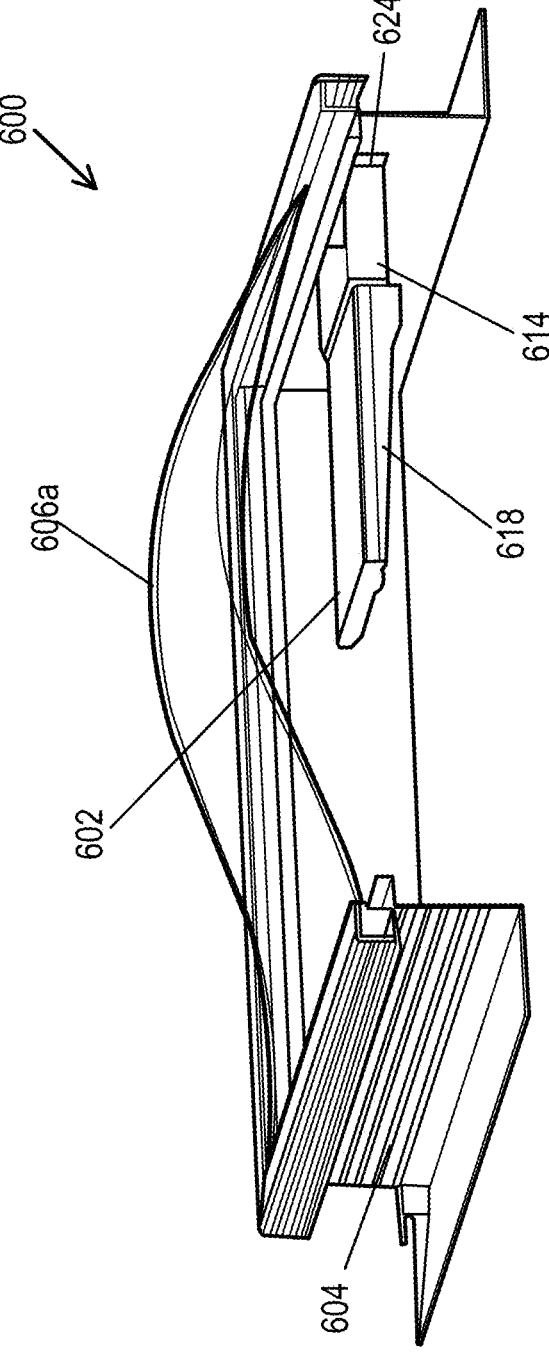
FIG. 6F is a cross-sectional view of the skylight from FIG. 6A.

FIGS. 6C-6F illustrate the coupling of the brackets 614 to the frame 604. As shown in FIGS. 6C-6E, the frame 604 includes an inward projecting horizontal member 620. A vertical member 622 extends upward from the horizontal member 620, forming a upward facing hook feature. The bracket 614 includes a hook 616 that is configured to mate with the vertical member 622 to hang or otherwise suspend the bracket 614 and solar power unit 602 from the frame 604. FIG. 6F illustrates the bracket 614 being permanently coupled with the frame 604, such as by welding. For example, the bracket 614 may include a flange 624 that may be used to receive a fastener and/or be welded to an interior surface of the frame 604.

In some embodiments, the solar power unit 602 may be coupled with a light source 618, such as a light source including one or more light emitting diodes (LEDs), although other light sources may be used in some embodiments. As illustrated here, the solar panel 602 and the light source 618 may be integrated into a single unit, with the light source 618 being positioned on an underside of the solar power unit 602. Such an arrangement allows the light source 618 to be powered directly by the solar power unit 602, which may include a battery that allows the solar power unit 602 to store electricity for later use by the light source 618. For example, the battery enables the light source 618 to be activated at night and/or during other periods in which no sunlight is present. In some embodiments, the light source 618 may be always on, may be motion-activated, light activated, and/or controlled by a switch. While illustrated here with a single rectangular solar power unit 602 and light source 618 positioned in a center of the frame 604, it will be appreciated that any number of solar power units 602 and/or light sources 618 of any shape may be positioned within an interior of the skylight 600 in any position and/or orientation.

Figure 7A:
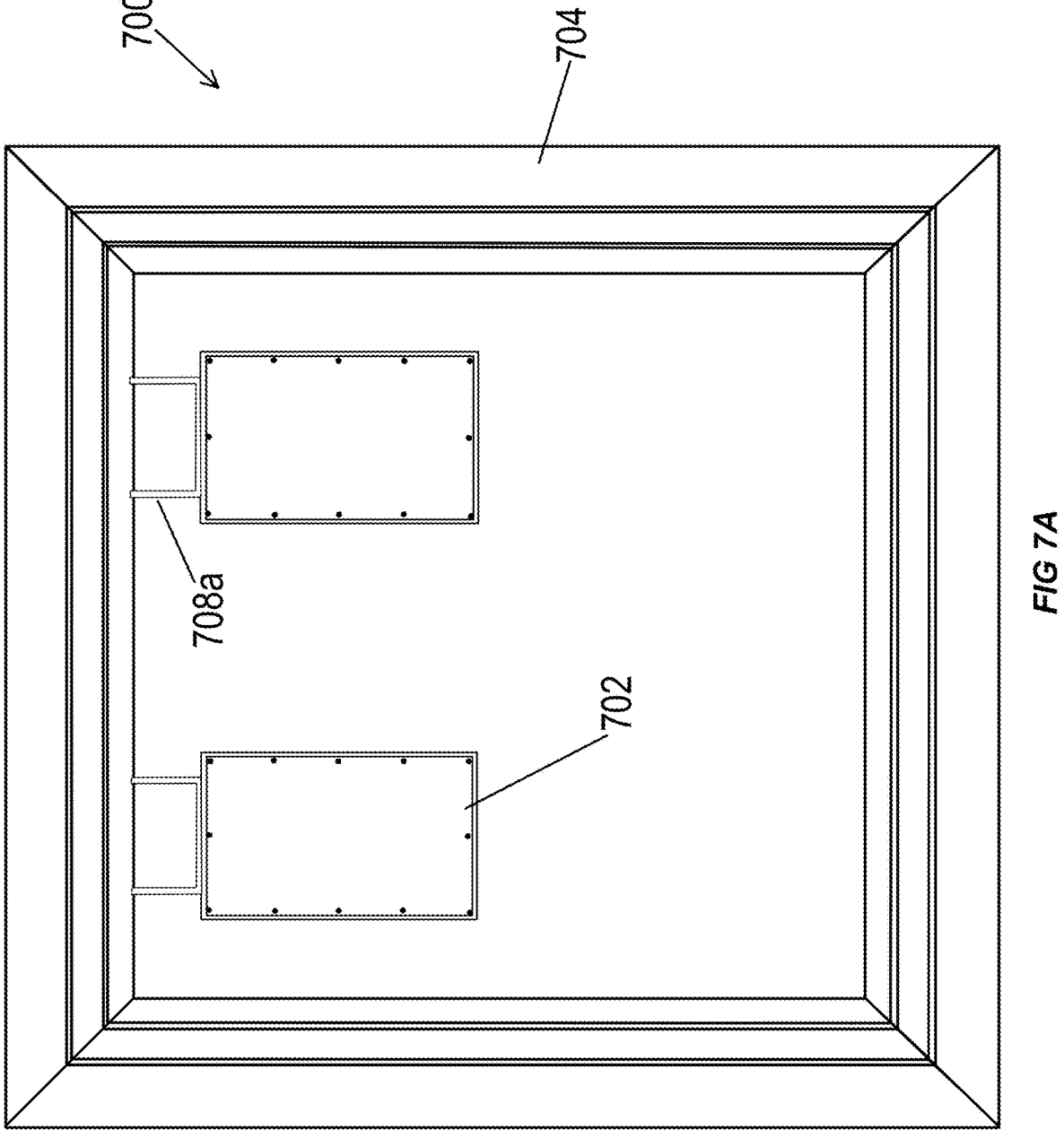
FIG. 7A is a top plan view of a skylight having multiple solar power units.
Figure 7B:
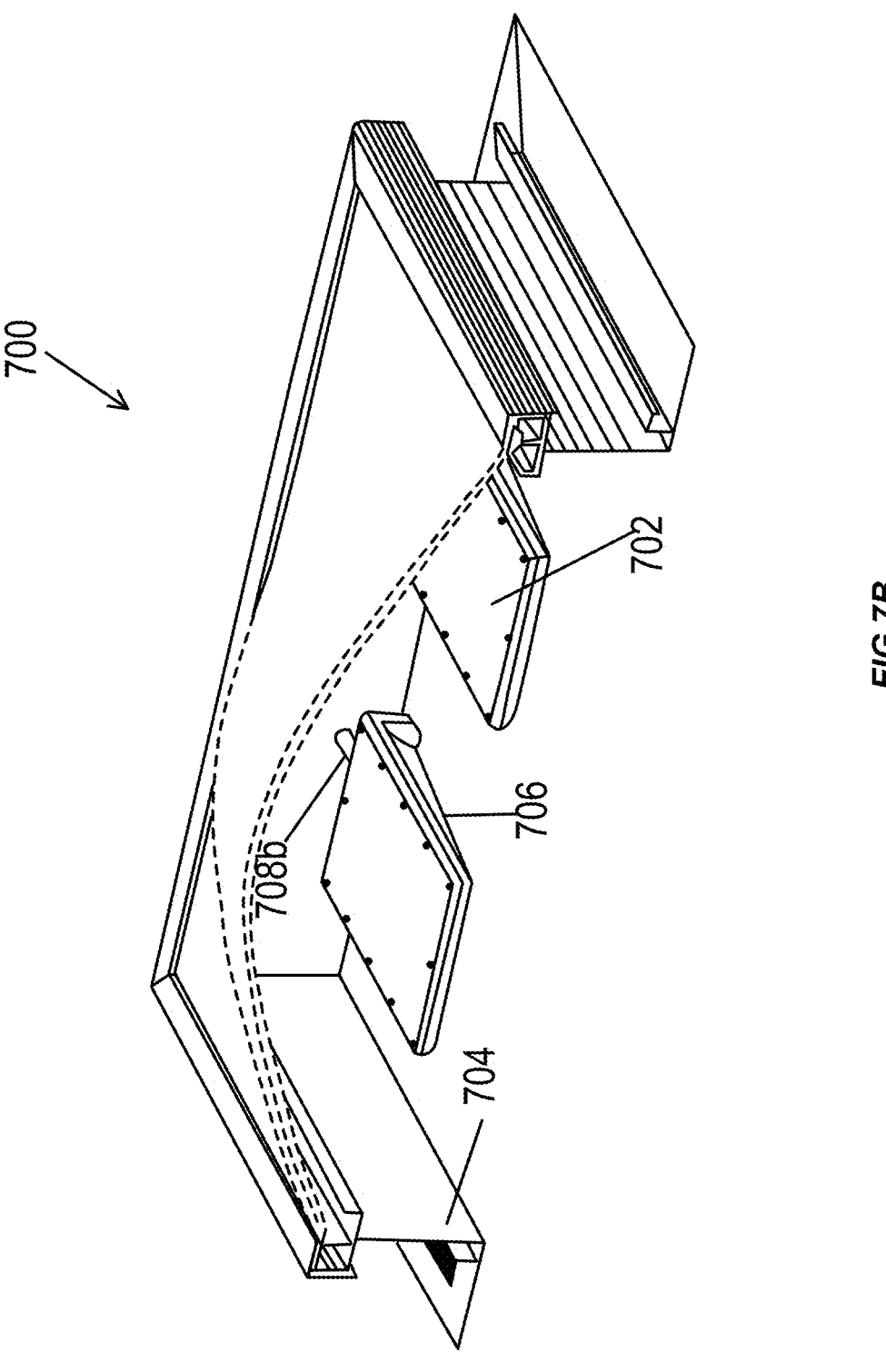
FIG. 7B is a cross-sectional view of the skylight of FIG. 7A.
Figure 7C:
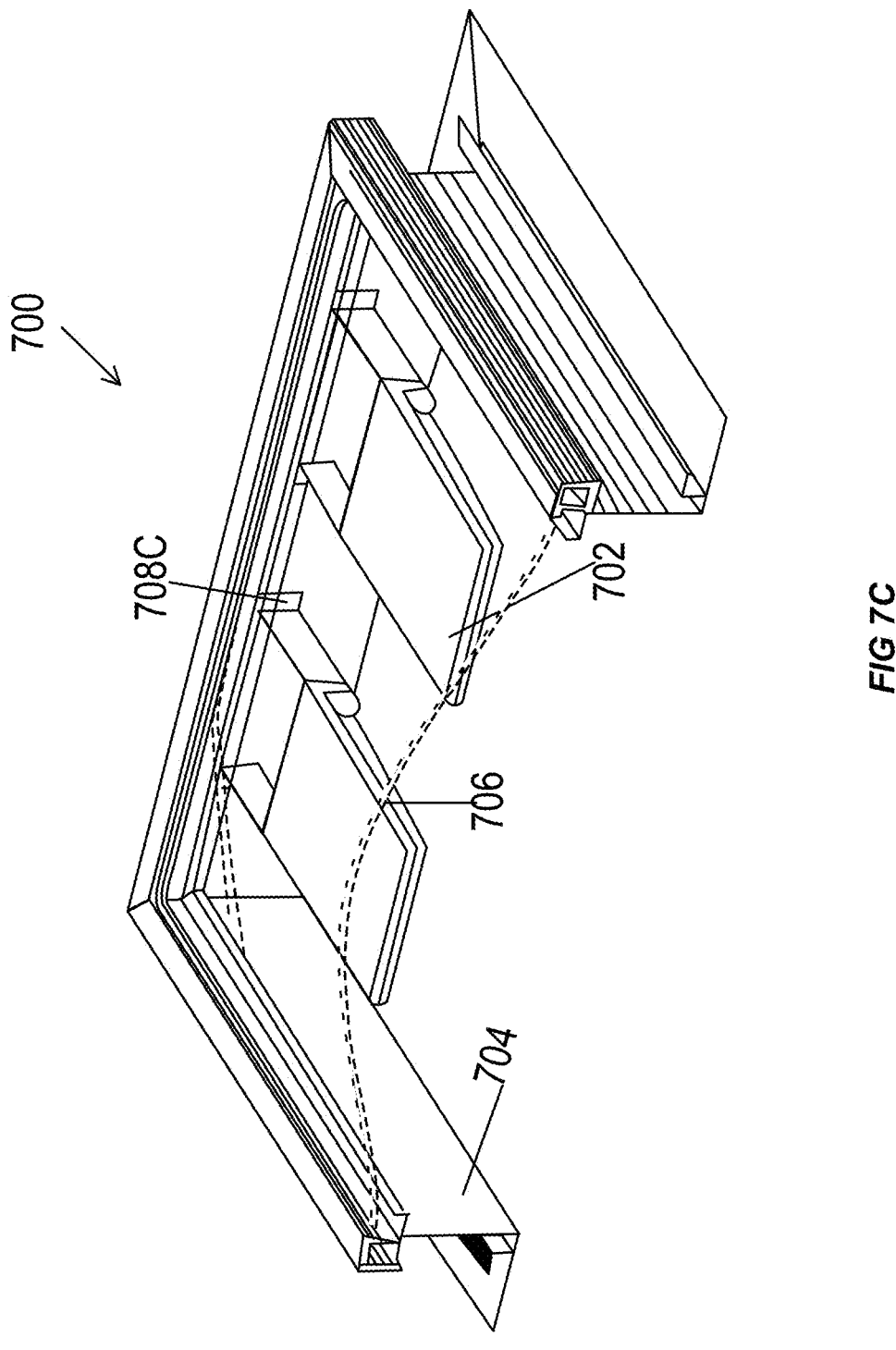
FIG. 7C is a cross-sectional view of the skylight of FIG. 7A.
Figure 7D:
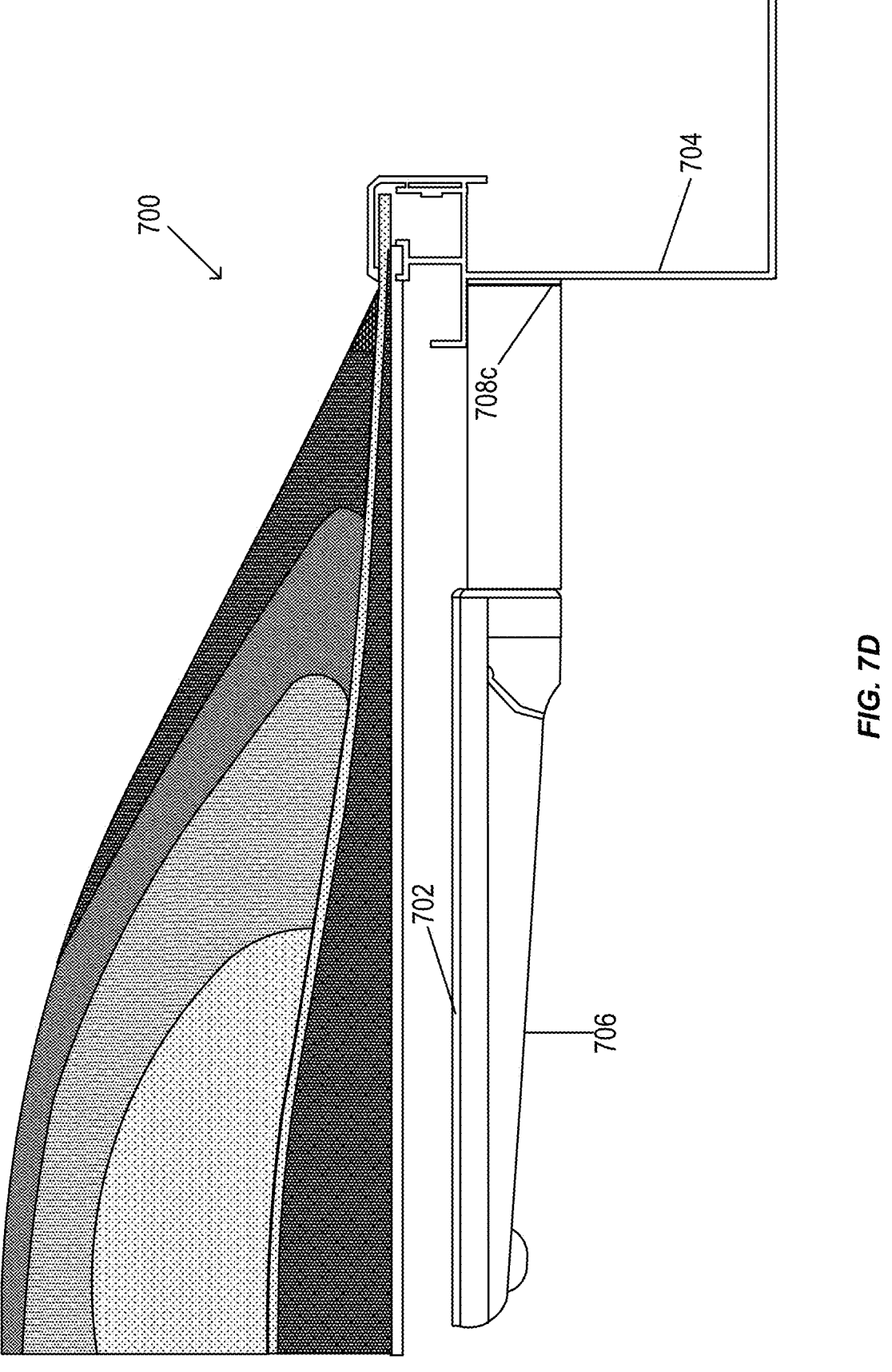
FIG. 7D is a partial side elevation cross-sectional view of the skylight from FIG. 7A.

For example, FIGS. 7A-7D illustrate a skylight 700 (which may be similar to or different than any of the skylights described elsewhere herein) that includes multiple solar power units 702. In some embodiments, some or all of the solar power units 702 may include an integrated light source 706. While shown with the solar power units 702 positioned on a single side of the frame 704 of the skylight 700, it will be appreciated that in some embodiments some or all of the solar power units 702 may be positioned on different sides of the frame 704. As detailed above, each solar power unit 702 may be coupled with the frame (either permanently or removably) using a mounting device, such as a bracket 708. As illustrated in FIG. 7A, bracket 708*a* is configured to hook onto a portion of the frame 704 such that the bracket 708*a* may be removed from the skylight 700, such as for servicing, replacement, and/or to change a location of the bracket 708*a* and solar power unit 702. FIG. 7B illustrates an embodiment in which the solar power units 702 are fixed to the frame 704 using a bracket 708*b* in the form of a fixed rod that is permanently coupled with the frame 704. FIGS. 7C and D illustrate an embodiment in which the solar power units 702 are mounted to the frame 704 using brackets 708*c* that are welded onto the frame 704.

Figure 8A:
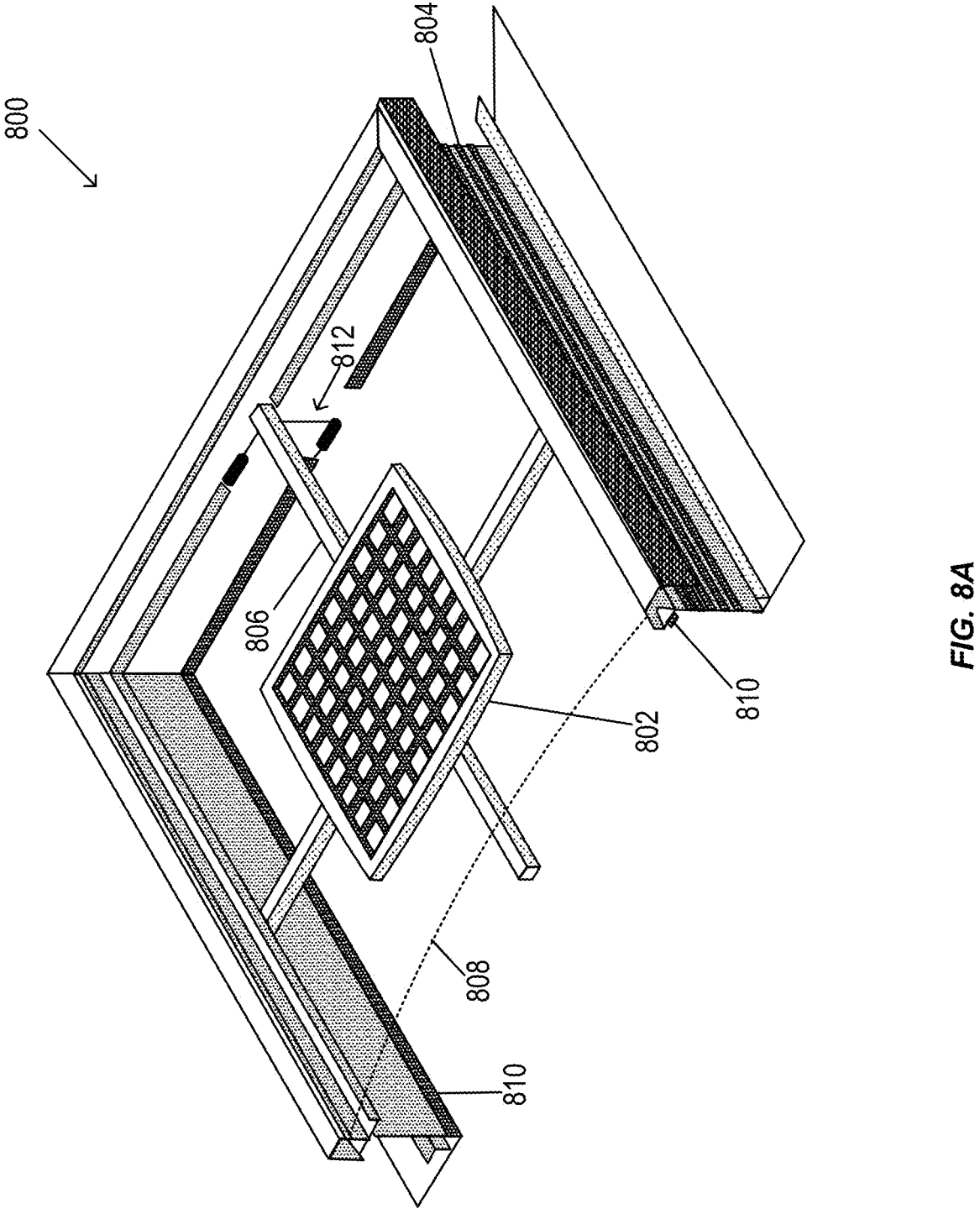
FIG. 8A is a partial isometric view of a skylight having a solar power unit positioned in a center of the skylight.
Figure 8B:
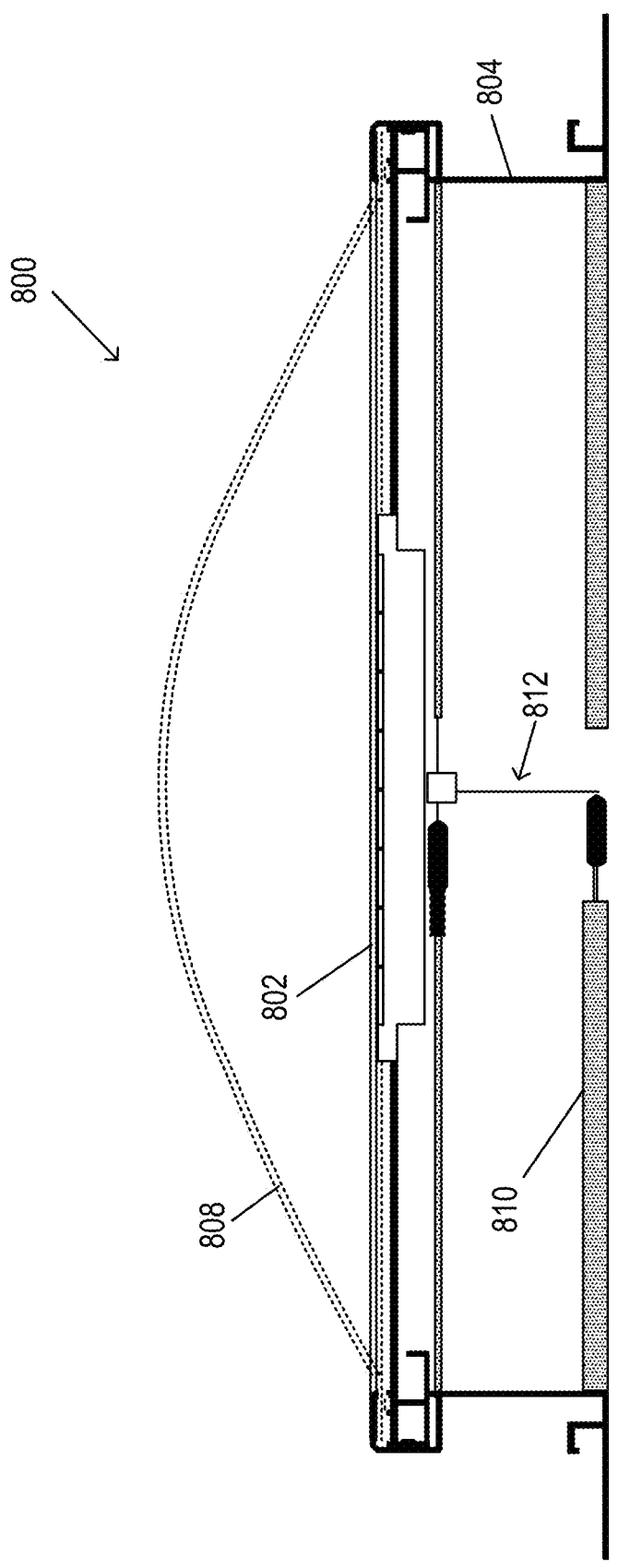
FIG. 8B is a side elevation cross sectional view of the skylight from FIG. 8A.
Figure 8C:
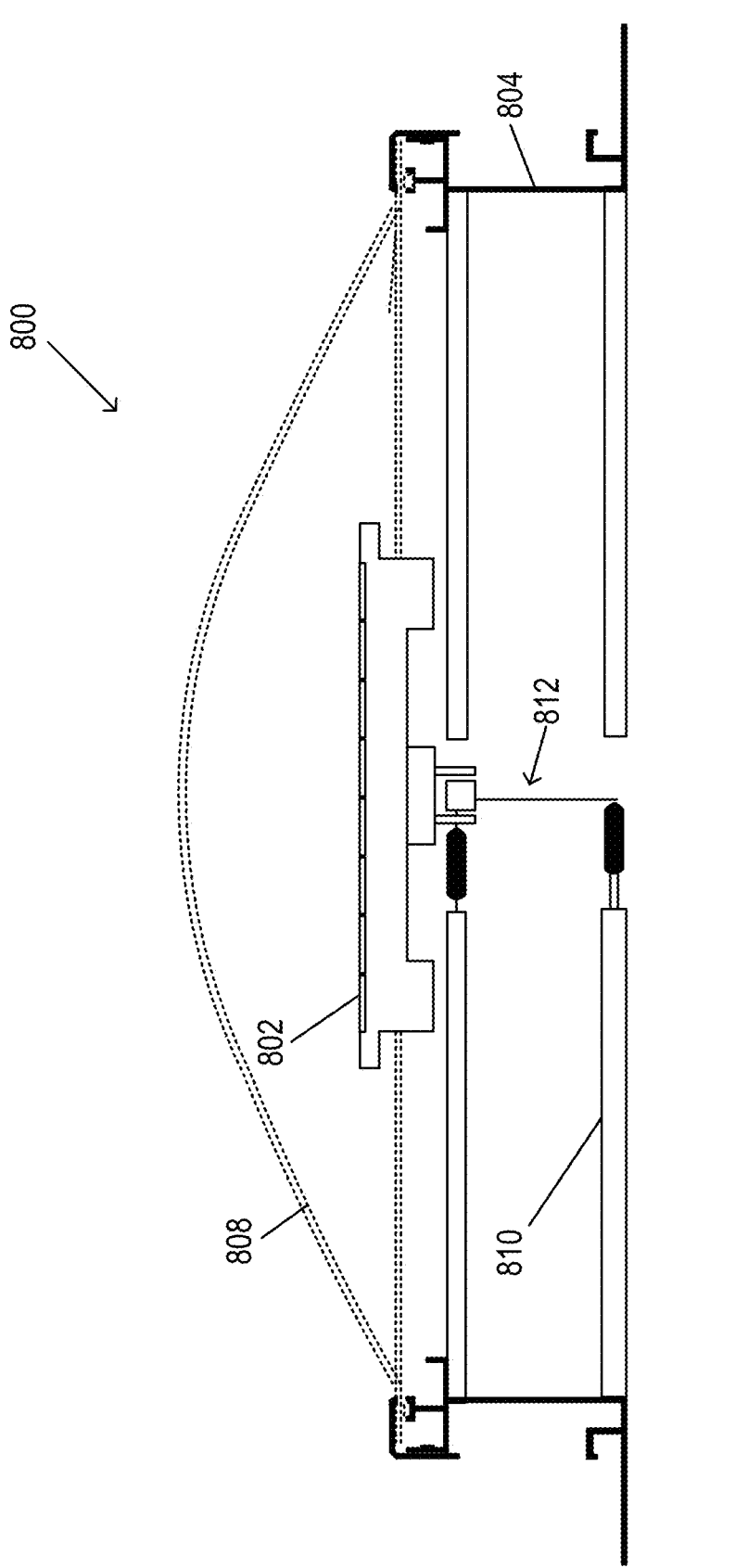
FIG. 8C is a front elevation cross sectional view of the skylight from FIG. 8A.

FIGS. 8A-8C illustrate embodiments of a skylight 800 that includes a solar power unit 802 positioned in a center of the skylight 800. Here, the skylight 800 includes one or more mounting brackets 806 that extend between a side of a frame 804 to the solar power unit 802. While shown here with four mounting brackets 806 each extending from a center of a respective side of the frame 804, it will be appreciated that other numbers of mounting brackets 806 may be used and/or a position of the mounting brackets 806 relative to the frame 804 and/or solar power unit 802 may vary. As illustrated, the solar power unit 802 is mounted atop the mounting brackets 806 while still being protected in a position beneath a skylight panel 808. Skylight 800 also includes one or more light sources 810. As illustrated, the light sources 810 are in the form of LED strips that run along inward and/or downward facing surfaces of the frame 804. In some embodiments, the light sources 810 are powered by the solar power unit 802 via one or more wires 812 that extend between the solar power unit 802 and the light source 810. For example, the wires 812 may be run from the solar power unit 802 alongside, atop, underneath, and/or through one or more of the mounting brackets 806 until the wires 812 reach the frame 804. The wires 812 may then be dropped down alongside and/or through the frame 804 and/or otherwise routed to the light sources 810. By routing the wires 812 in such a manner, a very neat appearance may be maintained without any loose wires 812 being present.

Figure 9A:
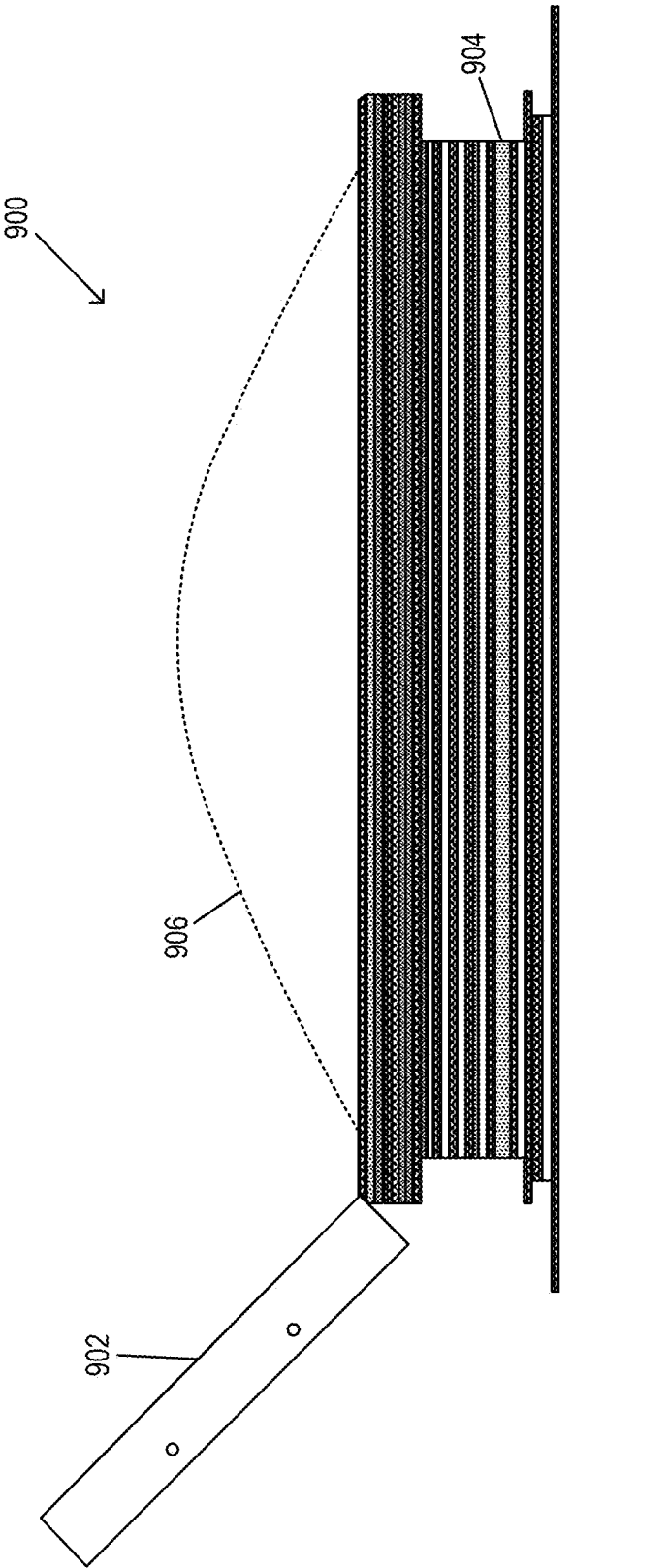
FIG. 9A is a side elevation view of a skylight having an external solar power unit.
Figure 9B:
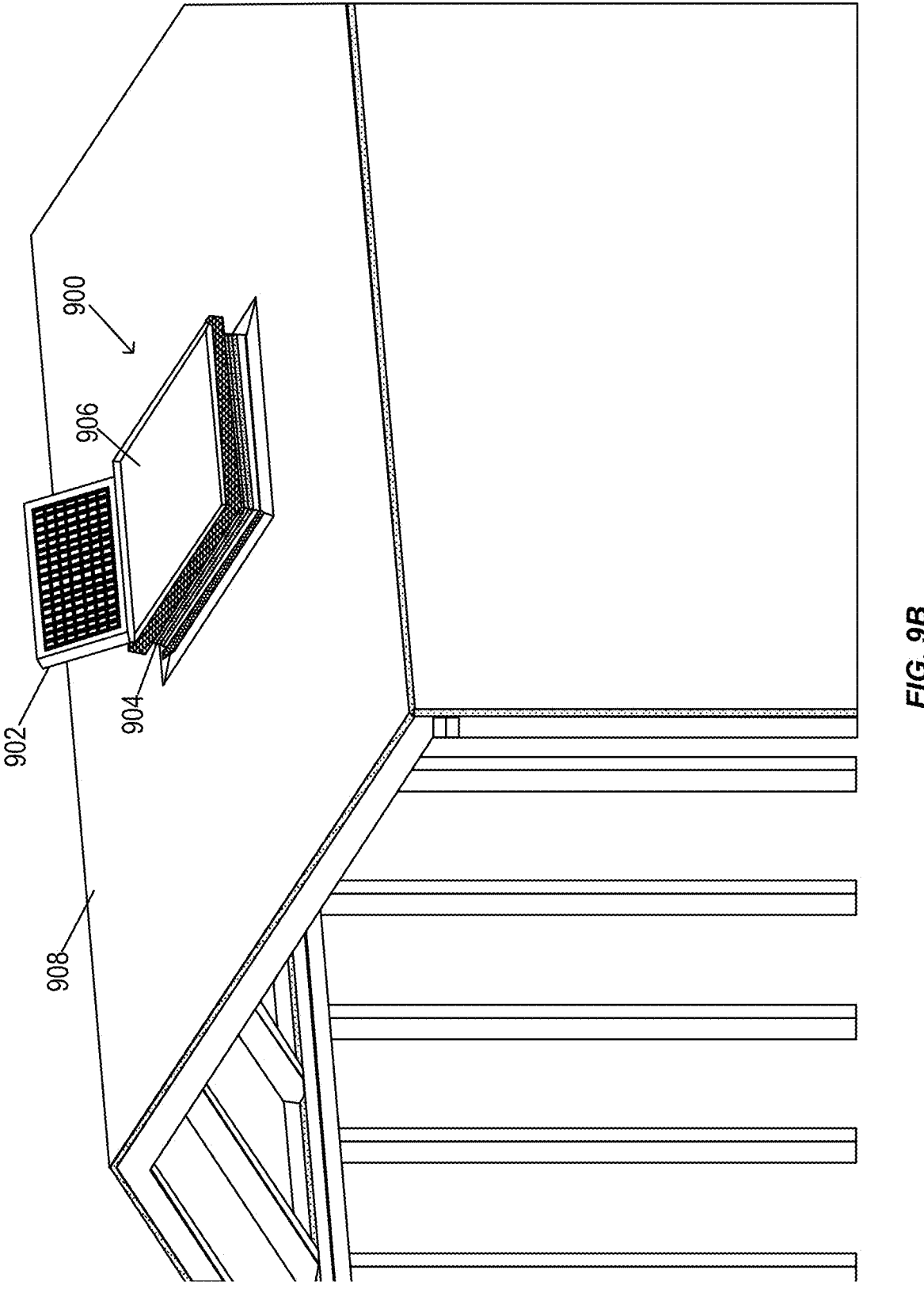
FIG. 9B is an isometric view of the skylight from FIG. 9A installed on a roof.
Figure 9C:
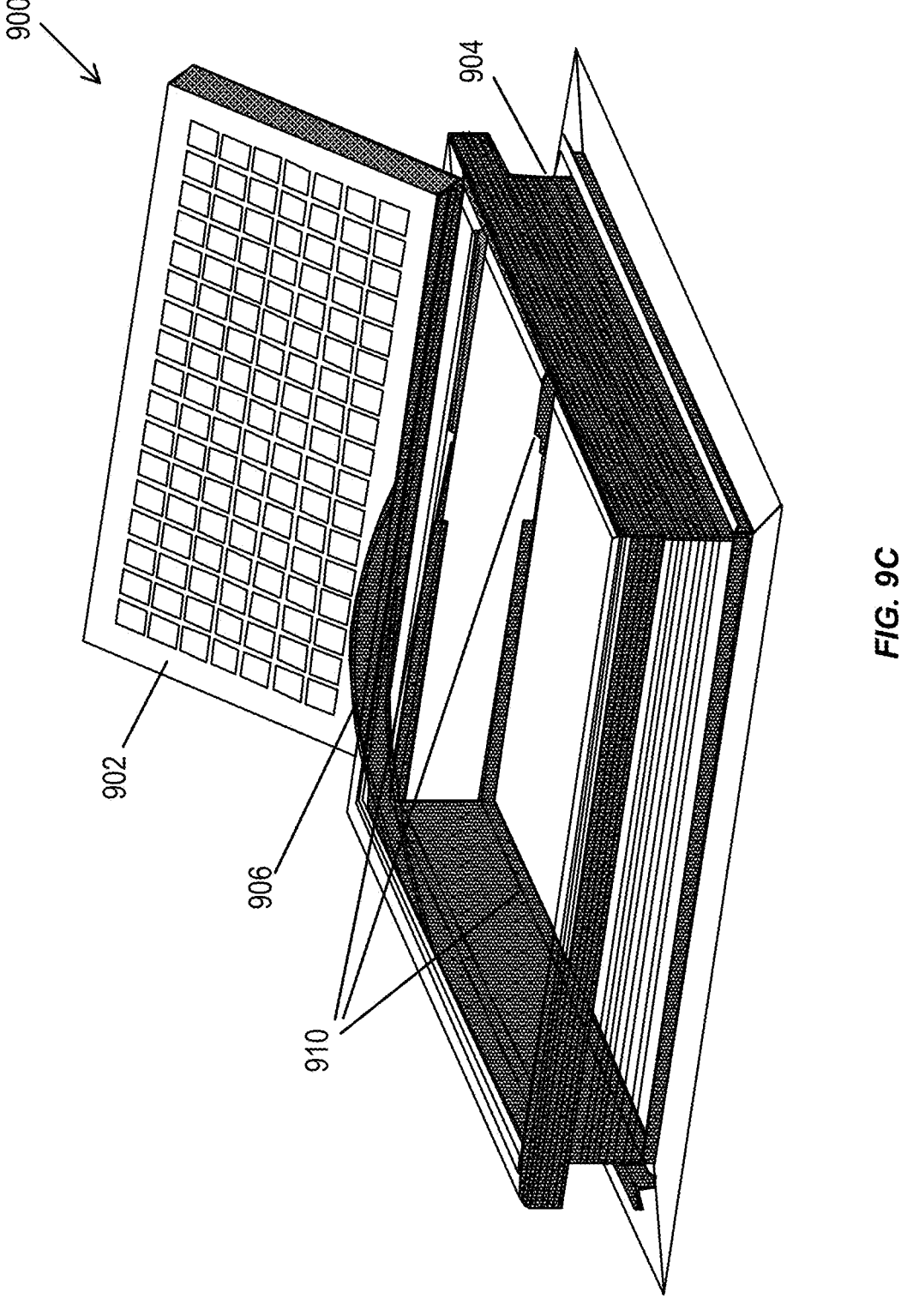
FIG. 9C is an isometric view of the skylight from FIG. 9A.

FIGS. 9A-9C illustrate an embodiment of a skylight 900 that includes an external solar power unit 902. For example, rather than being positioned underneath a skylight panel 906, the solar power unit 902 may be positioned completely outside of the skylight 900 and exposed to the elements, with the solar power unit 902 being coupled with a frame 904 of the skylight 900. By placing the solar power unit 902 outside of the skylight panel 906 it may make it easier to angle and/or otherwise position the solar power unit 902 such that the solar cells are oriented in a most efficient manner based on the position of the sun. In some embodiments, the solar power unit 902 may be pivotally coupled with the frame 904 and/or otherwise adjustable such that the solar power unit 902 may be aligned in a most desirable direction regardless of the slope of the roof of the structure on which the skylight 900 is mounted. The solar power unit 902 may be coupled with the frame in a manner such that any wires extending from the solar power unit 902 to peripheral devices may be run though the frame 904 and/or otherwise sealed during the manufacturing process such that no additional holes need to be drilled in the roof to accommodate wiring.

As illustrated in FIG. 9B, the skylight 900 and solar power unit 902 may be installed in a roof of a structure 908, such as a shed. The electricity generated by the solar power unit 902 may be used to power lights, batteries, outlets, charging stations, and/or other equipment within and around the structure 908. For example, in some embodiments, the skylight 900 may also include one or more lighting elements 910, such as LED strips, which may be coupled with and/or integrated into the frame 904 of the skylight 900 and powered by the solar power unit 902 as illustrated in FIG. 9C. In other embodiments, standalone light sources (that are not part of the skylight 900) may be mounted and/or placed within the structure 908 and then powered by the solar power unit 902.

Figure 10A:
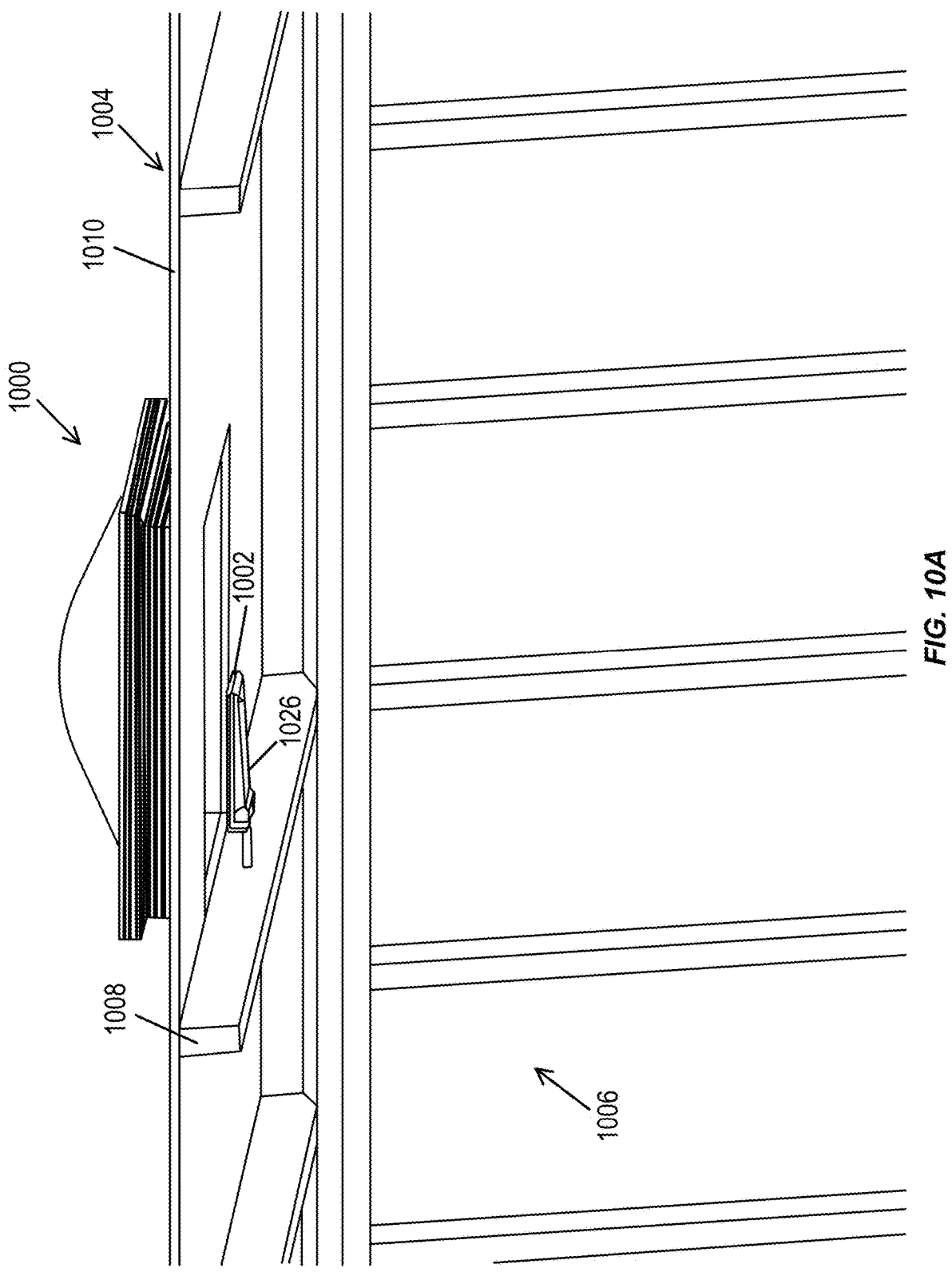
FIG. 10A illustrates a system for providing electricity to one or more components of a structure using a skylight with a solar power unit.
Figure 10B:
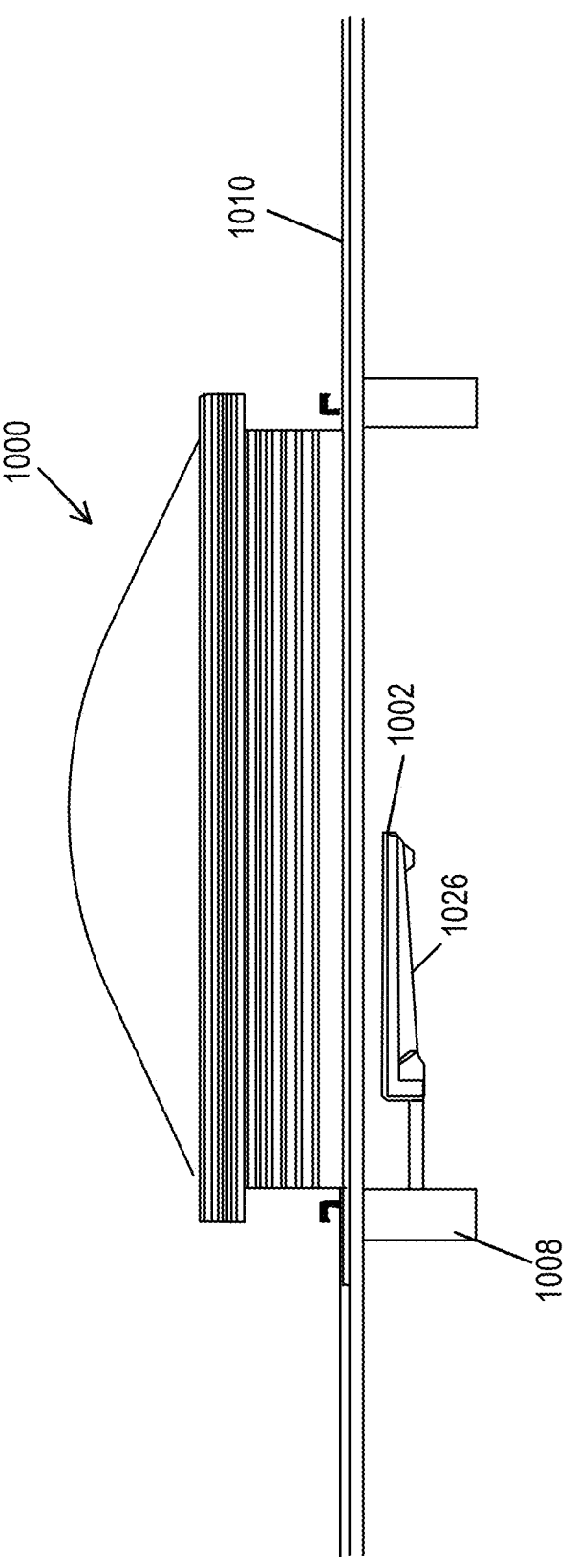
FIG. 10B illustrates the solar power unit of FIG. 10A with an integrated solar light source.
Figure 10C:
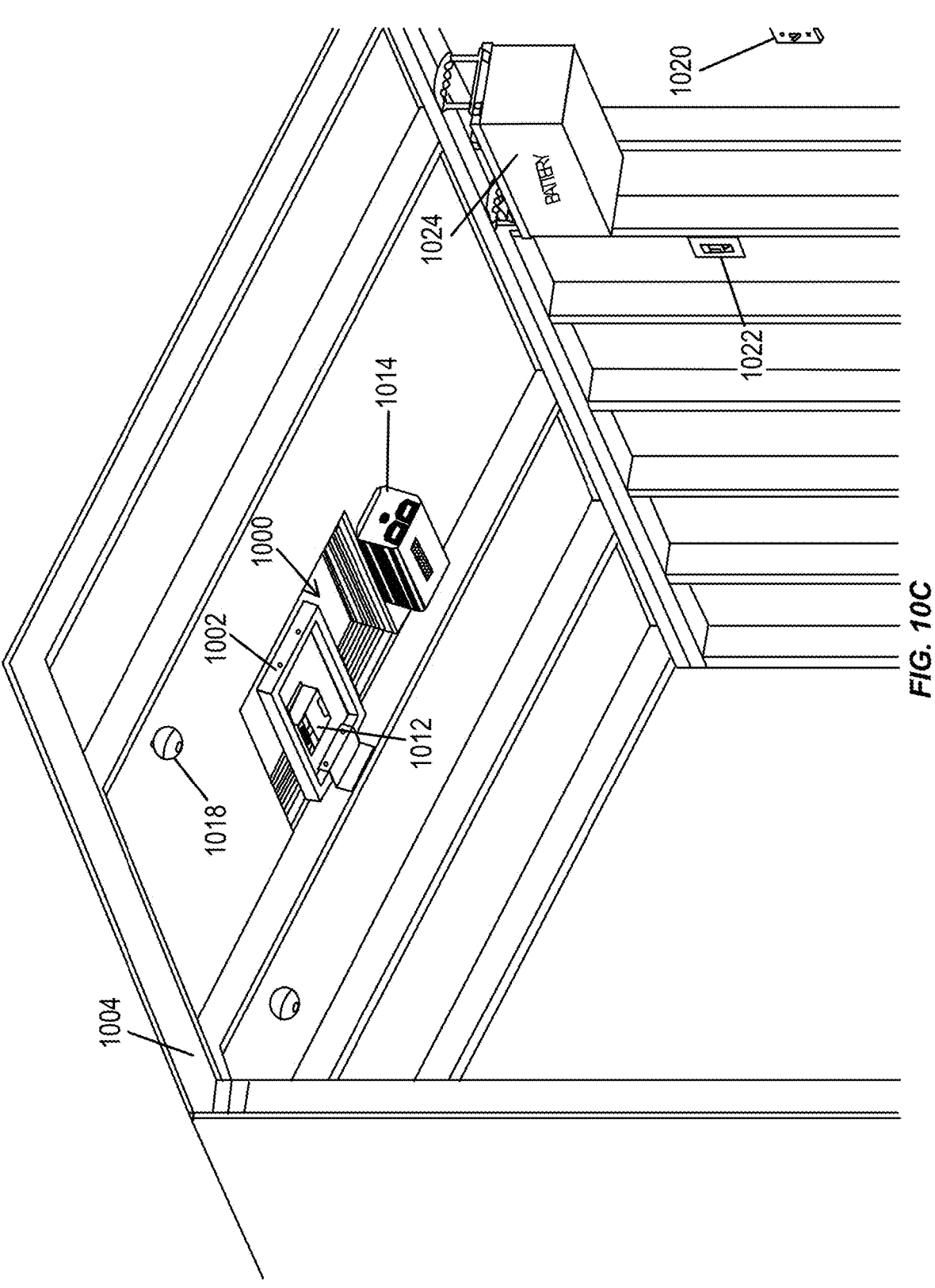
FIG. 10C illustrates a lower isometric view of the system of FIG. 10A.

FIGS. 10A-10C illustrate one embodiment of a system for providing electricity to one or more components of a structure using a skylight 1000 with a solar power unit 1002. Here, the solar power unit 1002 is a separate component that may be mounted to the roof separately from the skylight 1000. For example, the skylight 1000 may be installed on a roof 1004 of a structure 1006 with an opening for the skylight 1000 being formed within a roof sheathing 1010 between one or more roof joists 1008. The solar power unit 1002 may be mounted to one of the roof joists 1008 (such as by using a mounting bracket and/or other mounting equipment) and/or any other interior surface of the structure 1006 such that the solar power unit 1002 is positioned below the opening and is exposed to sunlight. In other embodiments, the solar power unit 1002 may be integrated into the structure of the skylight 1000 such as described elsewhere herein. In some embodiments, a charge controller 1012 may be coupled with the solar power unit 1002 to regulate current and/or voltage from the solar power unit 1002 to ensure batteries connected to the solar power unit 1002 are properly charged. A power inverter 1014 may be included to change direct current (D/C) from the solar power unit 1002 to alternating current (A/C) prior to the electricity being passed to other devices. The charge controller 1012 and/or power inverter 1014 may be placed within and/or on the structure 1006, such as by using separate mounting brackets that couple the components to structural components of the roof 1004 and/or wall 1016 of the structure 1006.

The power that is generated using the solar power unit 1002 may be used to power any number of devices. For example, the power may be used to power one or more interior lights 1018 that are installed within the structure 1006. These lights 1018 may be configured to be always on, motion activated, operated by a switch 1020, light activated, and/or otherwise controlled. The power from the solar power unit 1002 may also be used to power one or more outlets 1022 and/or trickle chargers that may be used to supply power and/or recharge other devices. In some embodiments, a power storage unit, such as a dedicated battery 1024 may be included to store excess power for later use.

In some embodiments, such as shown in FIG. 10B, the solar power unit 1002 may include an integrated light source 1026 similar to that described above in connection with FIGS. 6A-6F.

Figure 11A:
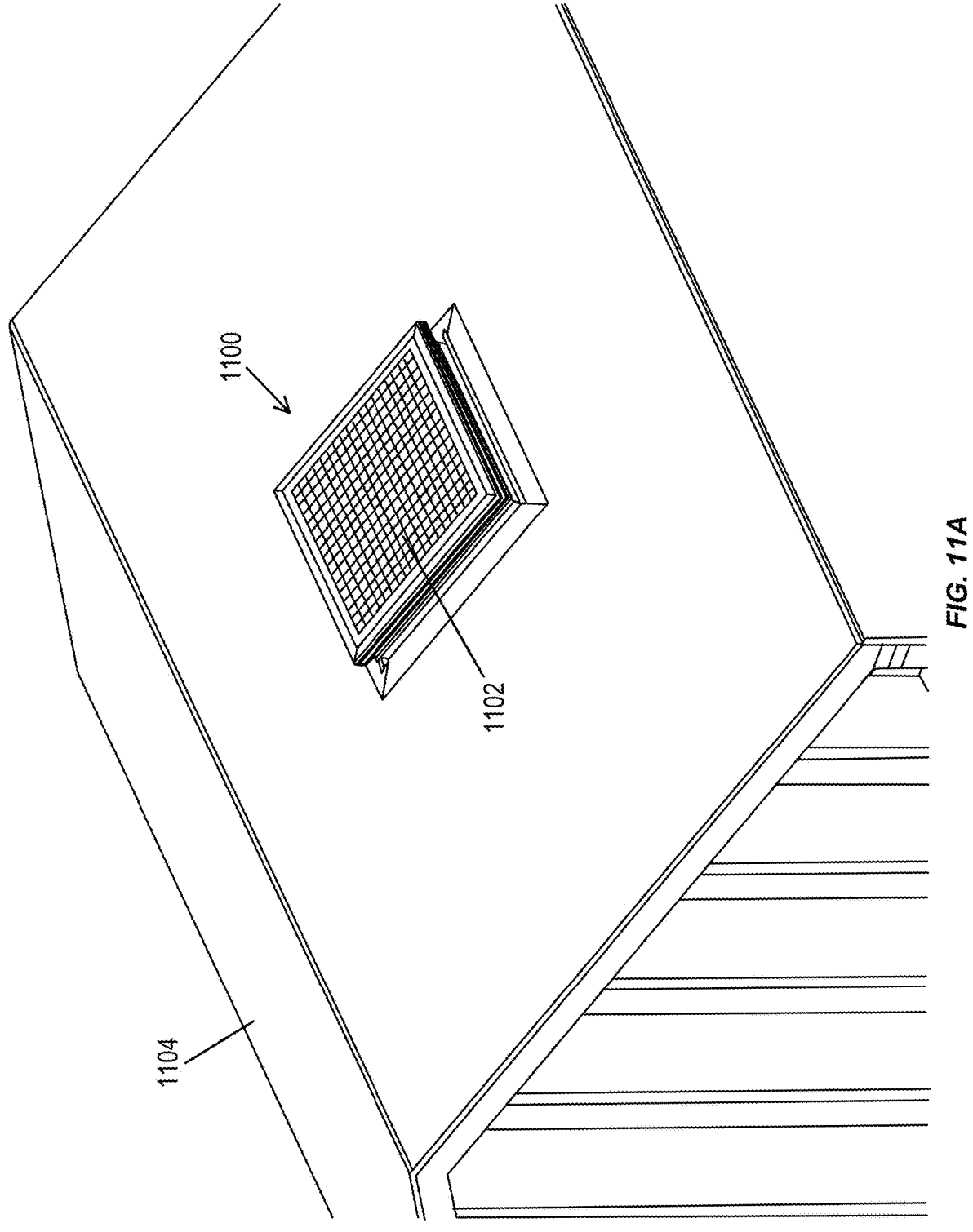
FIG. 11A illustrates a skylight that is primarily utilized to generate power using a solar power unit.
Figure 11B:
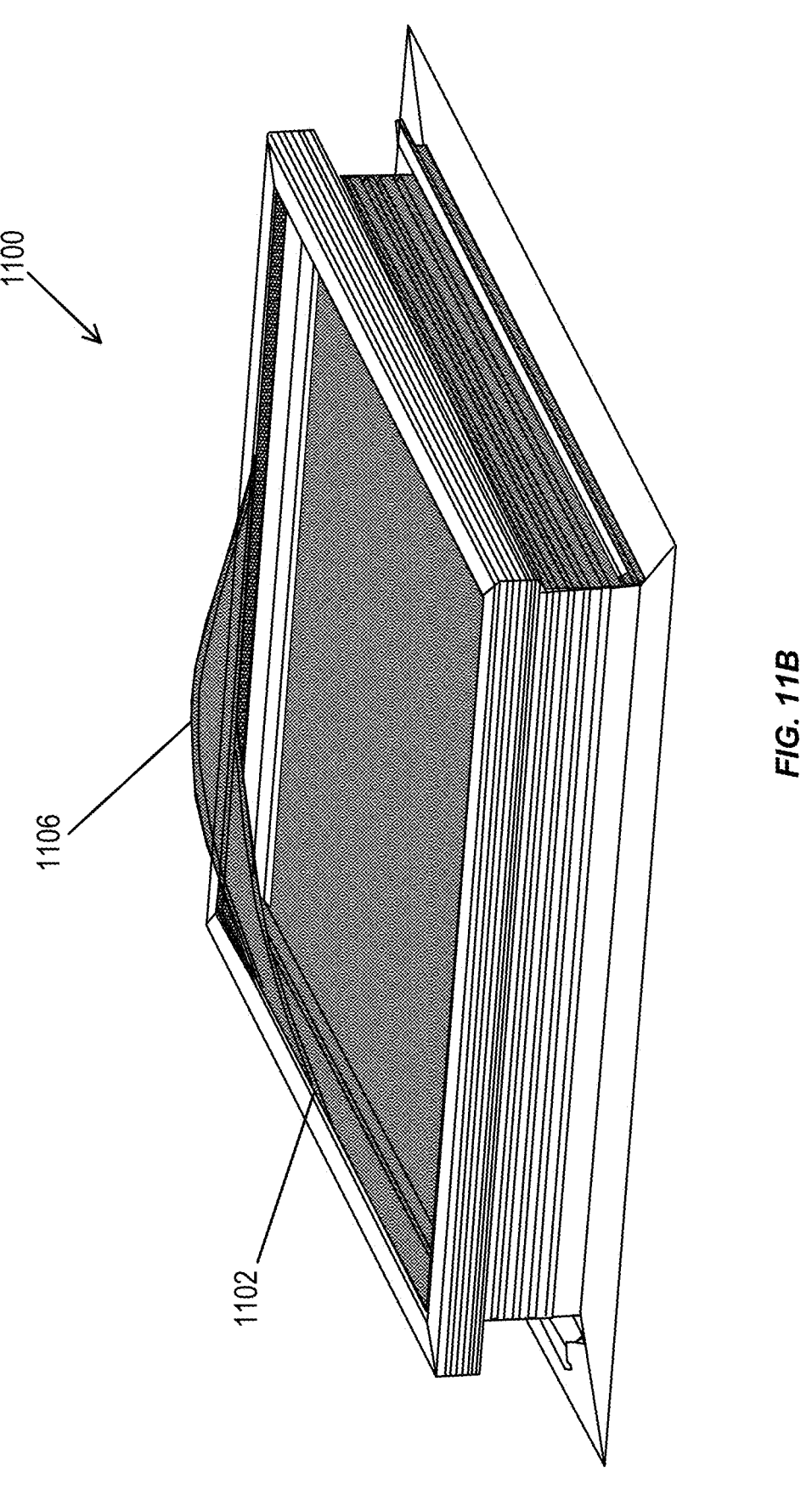
FIG. 11B is an isometric view of the skylight from FIG. 11A.
Figure 11C:
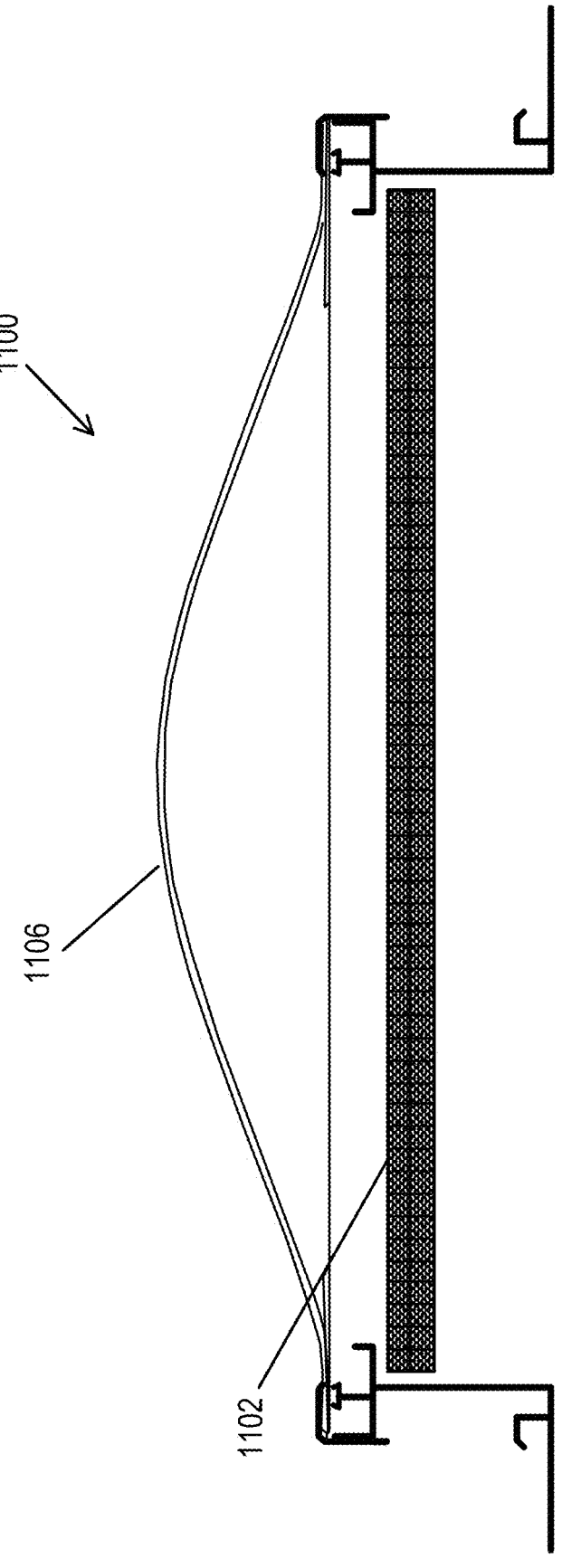
FIG. 11C is a side cross-sectional view of the skylight from FIG. 11A.
Figure 11D:
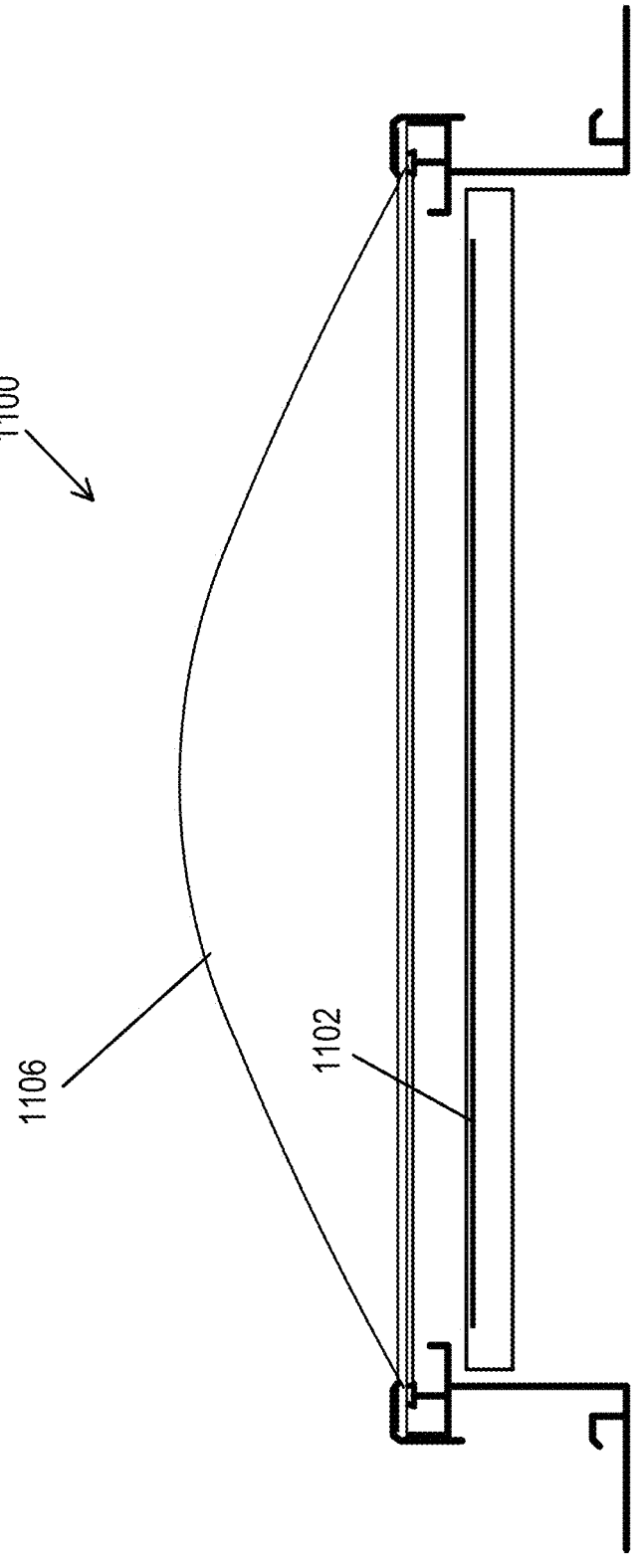
FIG. 11D is a side cross-sectional view of the skylight from FIG. 11A.
Figure 11E:
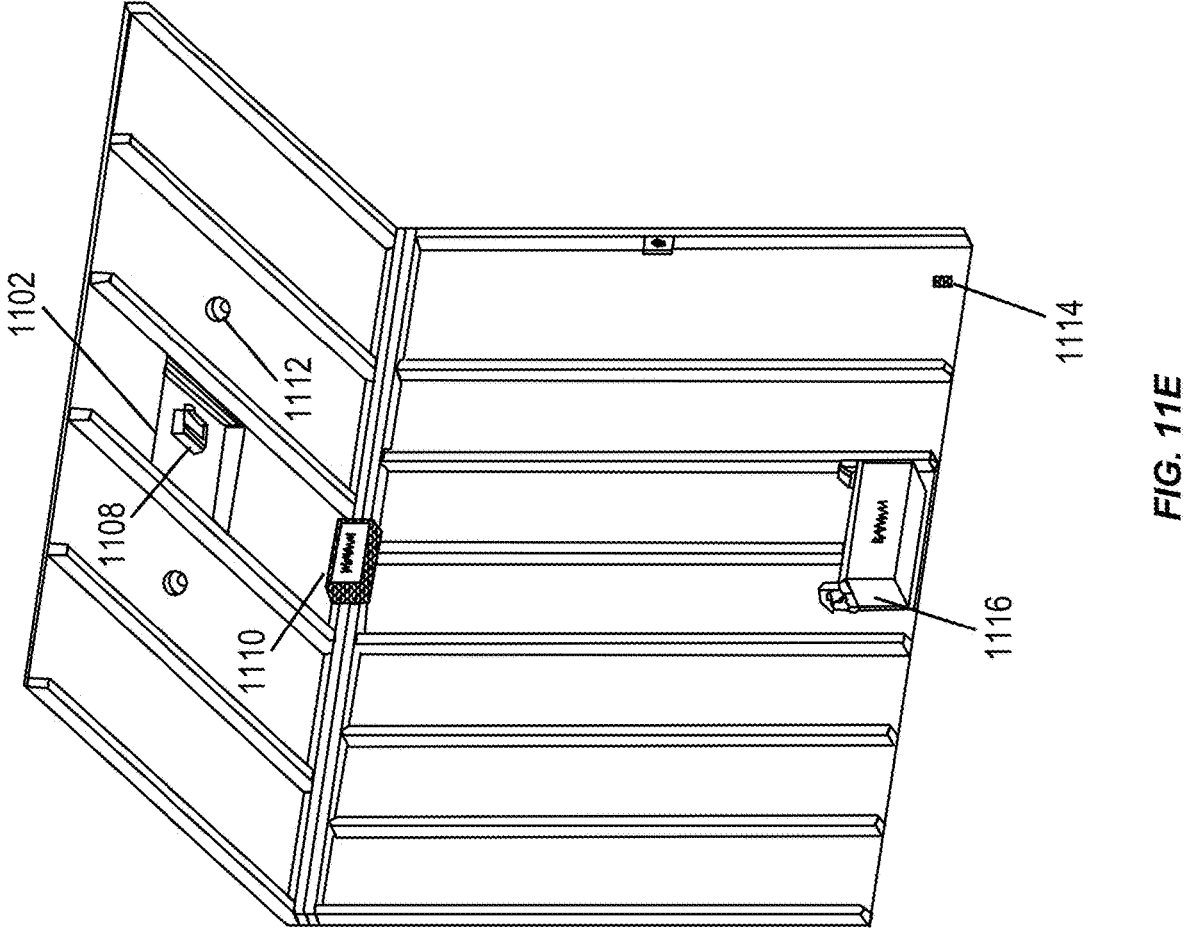
FIG. 11E illustrates the solar power unit of FIG. 11A electrically coupled with components of a structure.
Figure 12A:
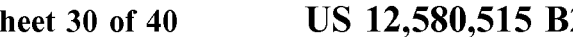
FIG. 12A is an isometric view of a skylight having an integrated solar power unit that extends across an entire width of the skylight.
Figure 12B:
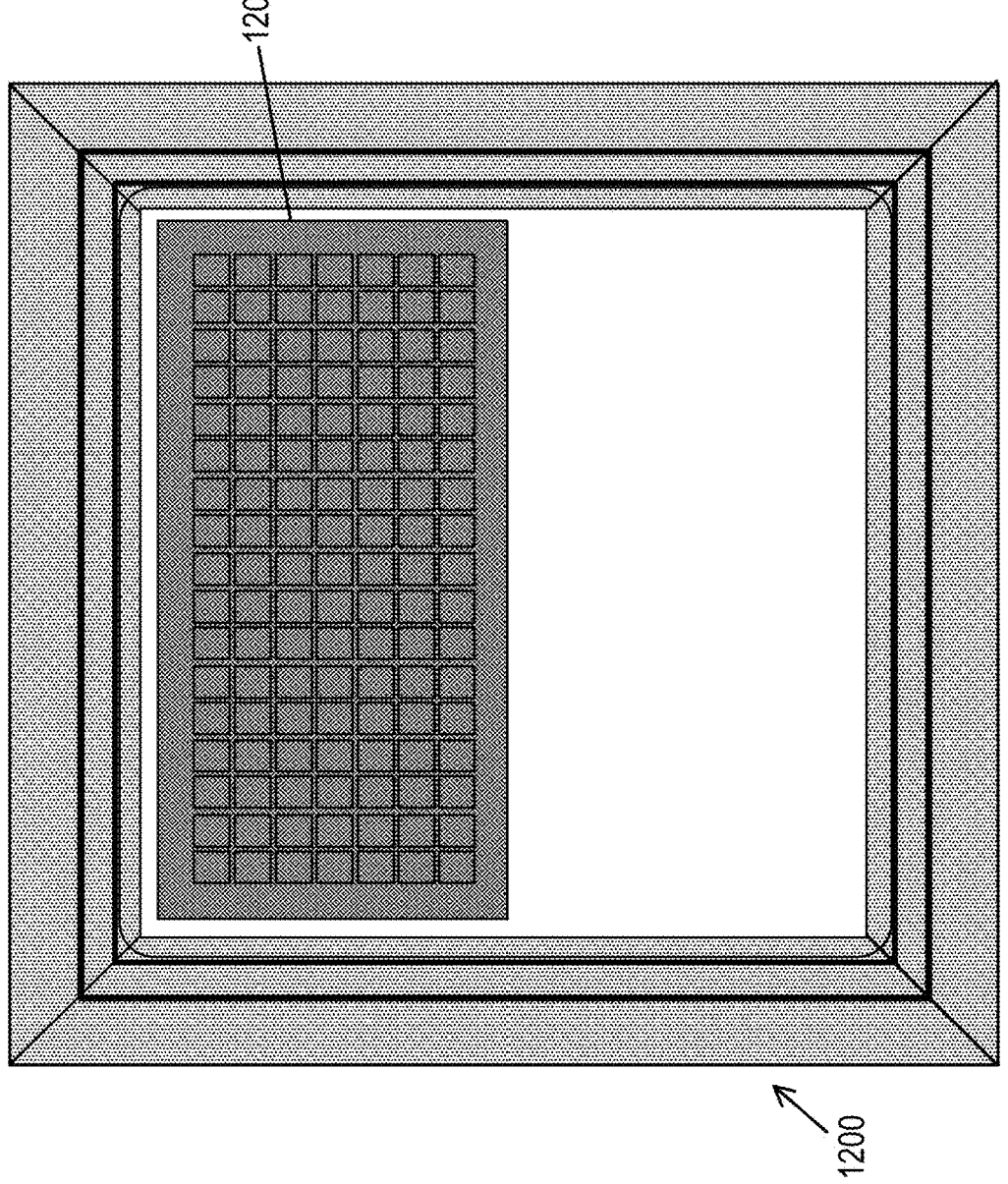
FIG. 12B is a top plan view of the skylight from FIG. 12A.
Figure 12C:
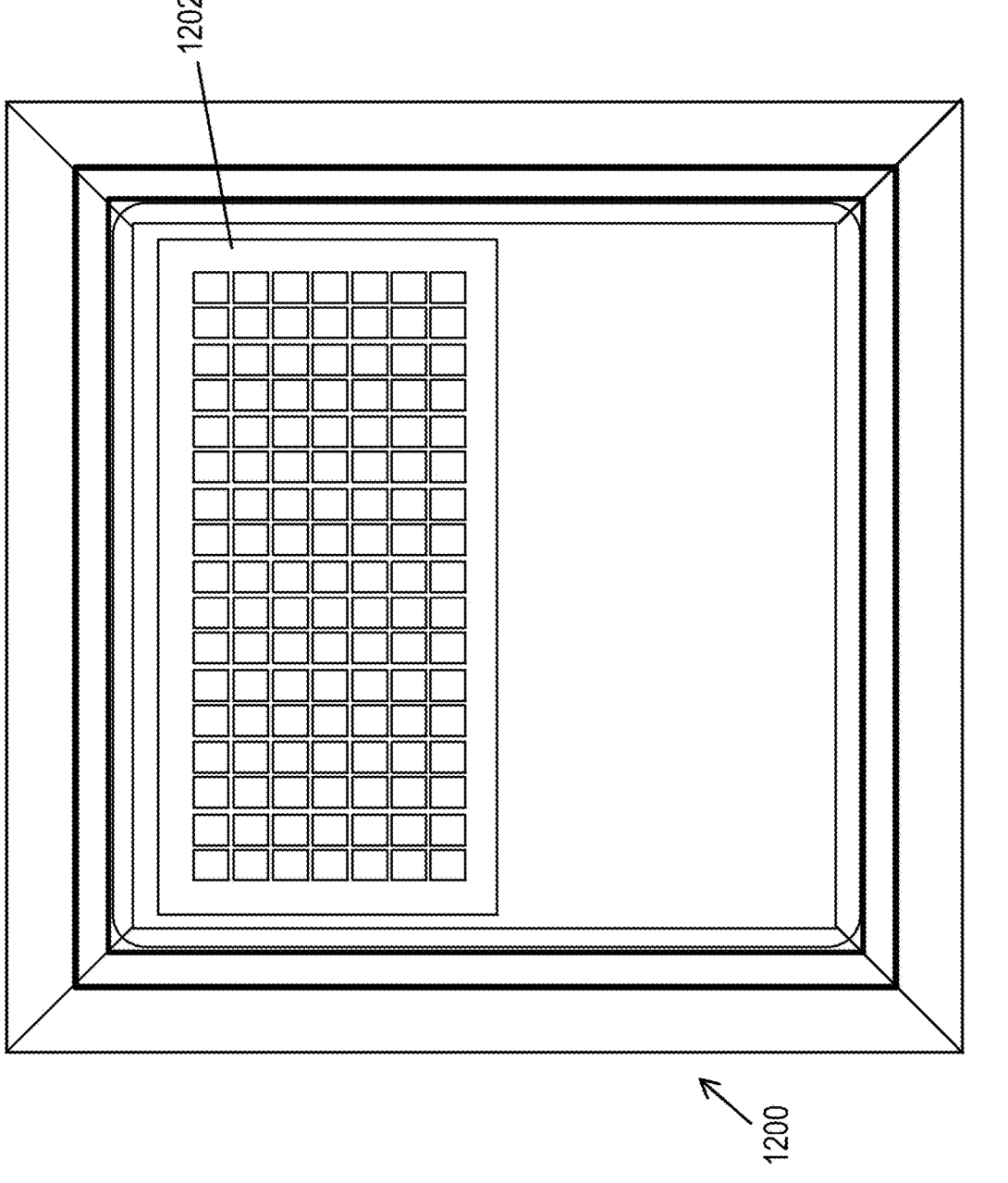
FIG. 12C is a top plan view of the skylight from FIG. 12A.
Figure 12D:
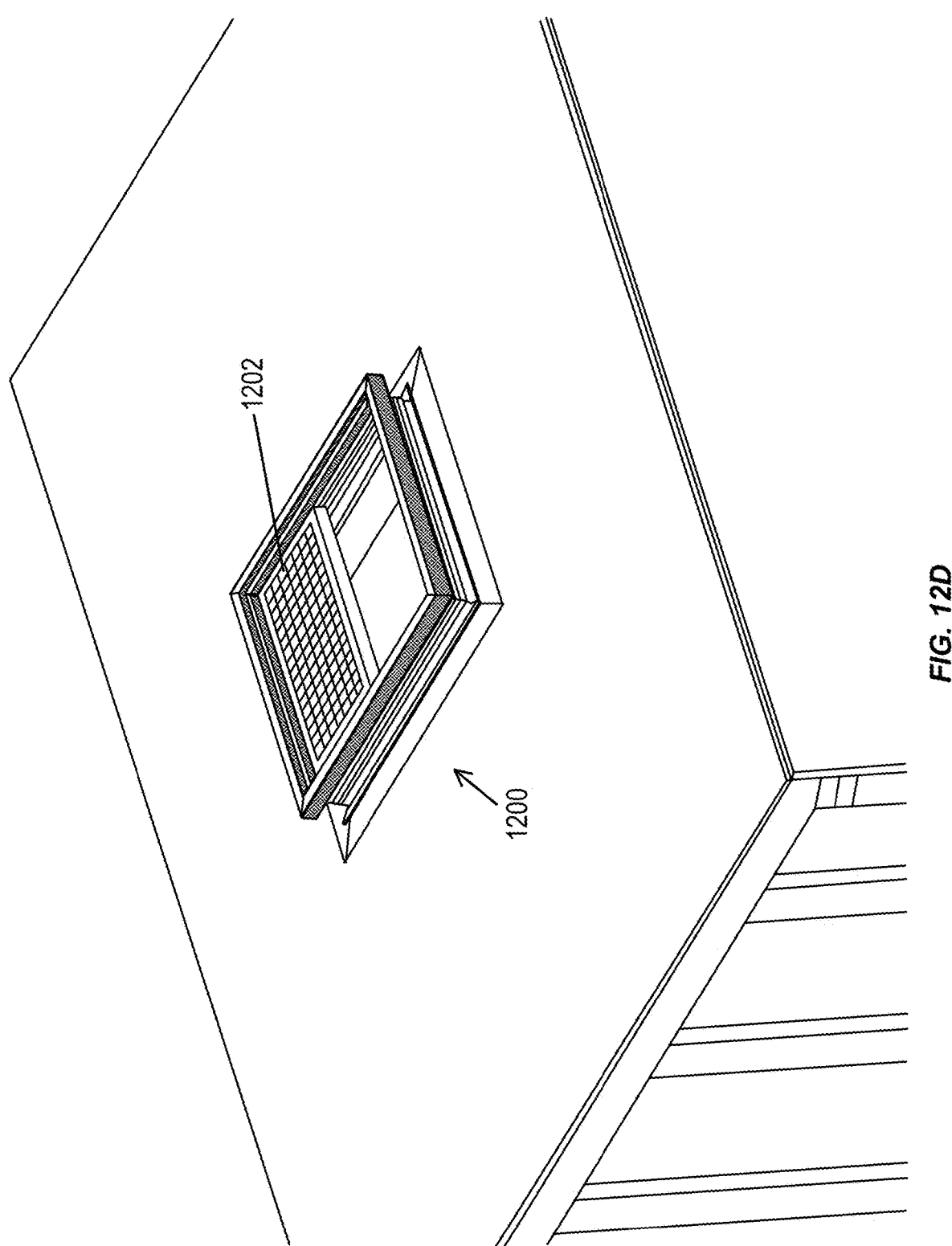
FIG. 12D is an isometric view of the skylight from FIG. 12A.
Figure 12E:
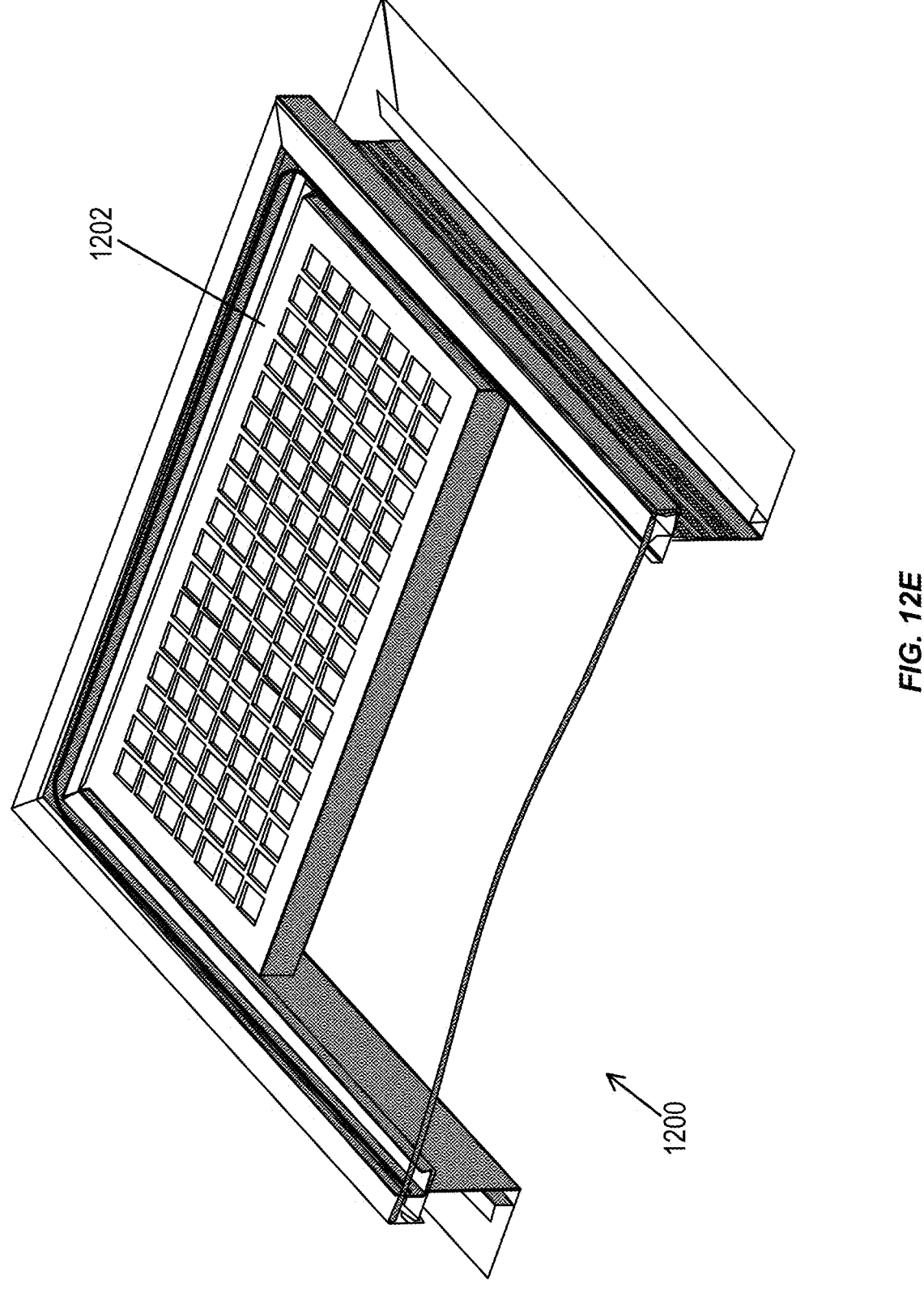
FIG. 12E is an isometric view of the skylight from FIG. 12A.
Figure 13A:
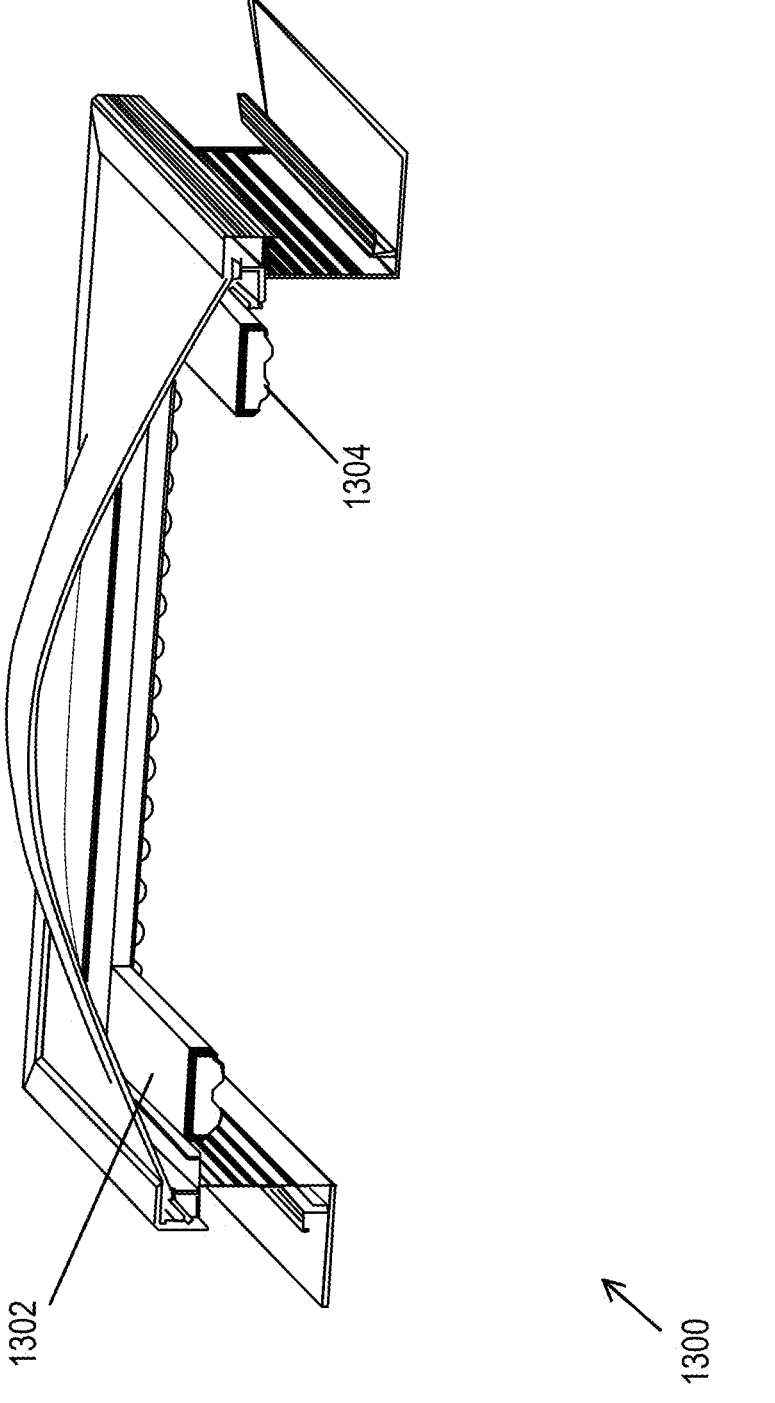
FIG. 13A is a partial cross-sectional view of a skylight that includes a solar power unit that forms a frame around a portion of an interior portion of the skylight.
Figure 13B:
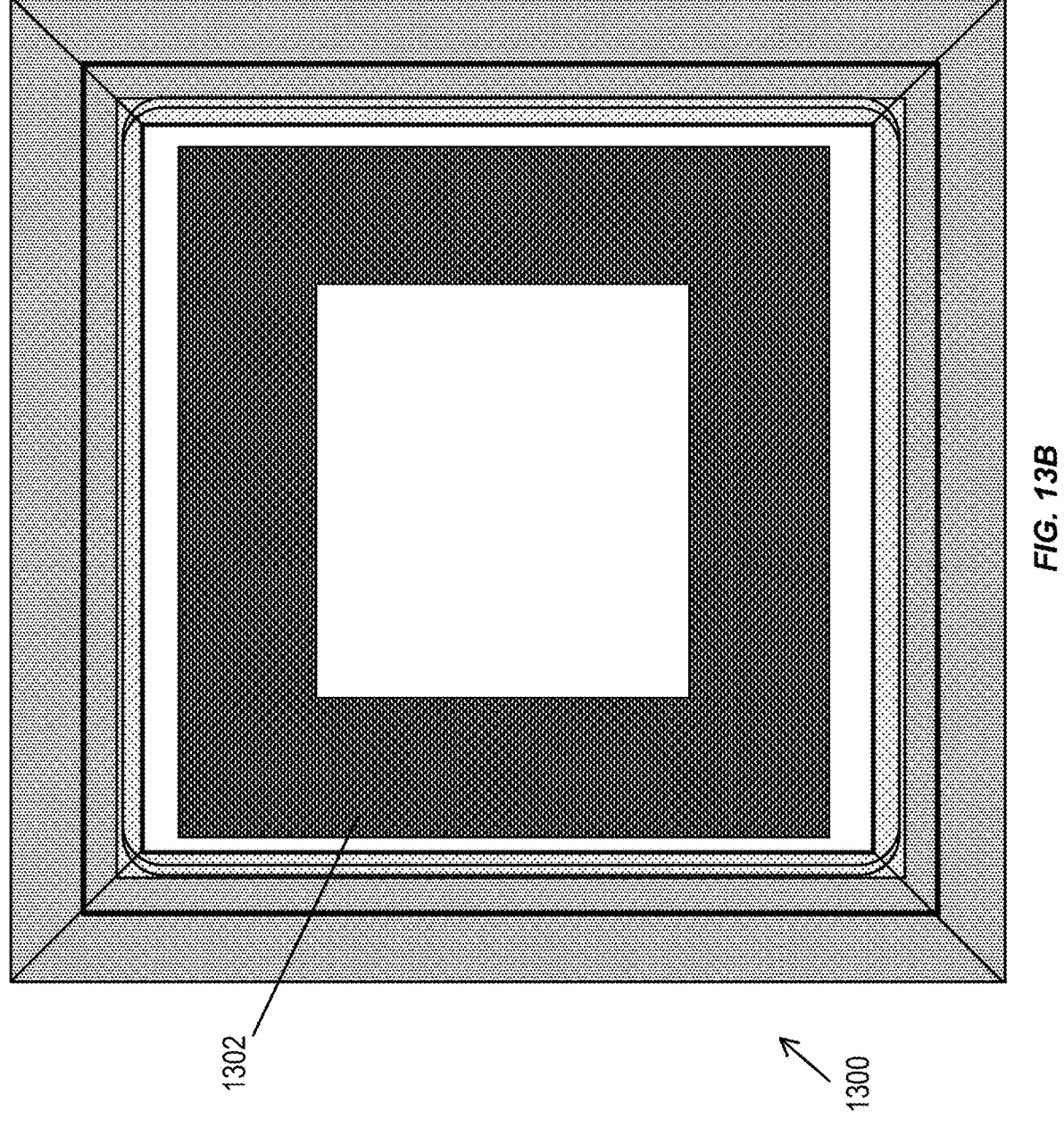
FIG. 13B is a top plan view of the skylight from FIG. 13A.
Figure 13C:
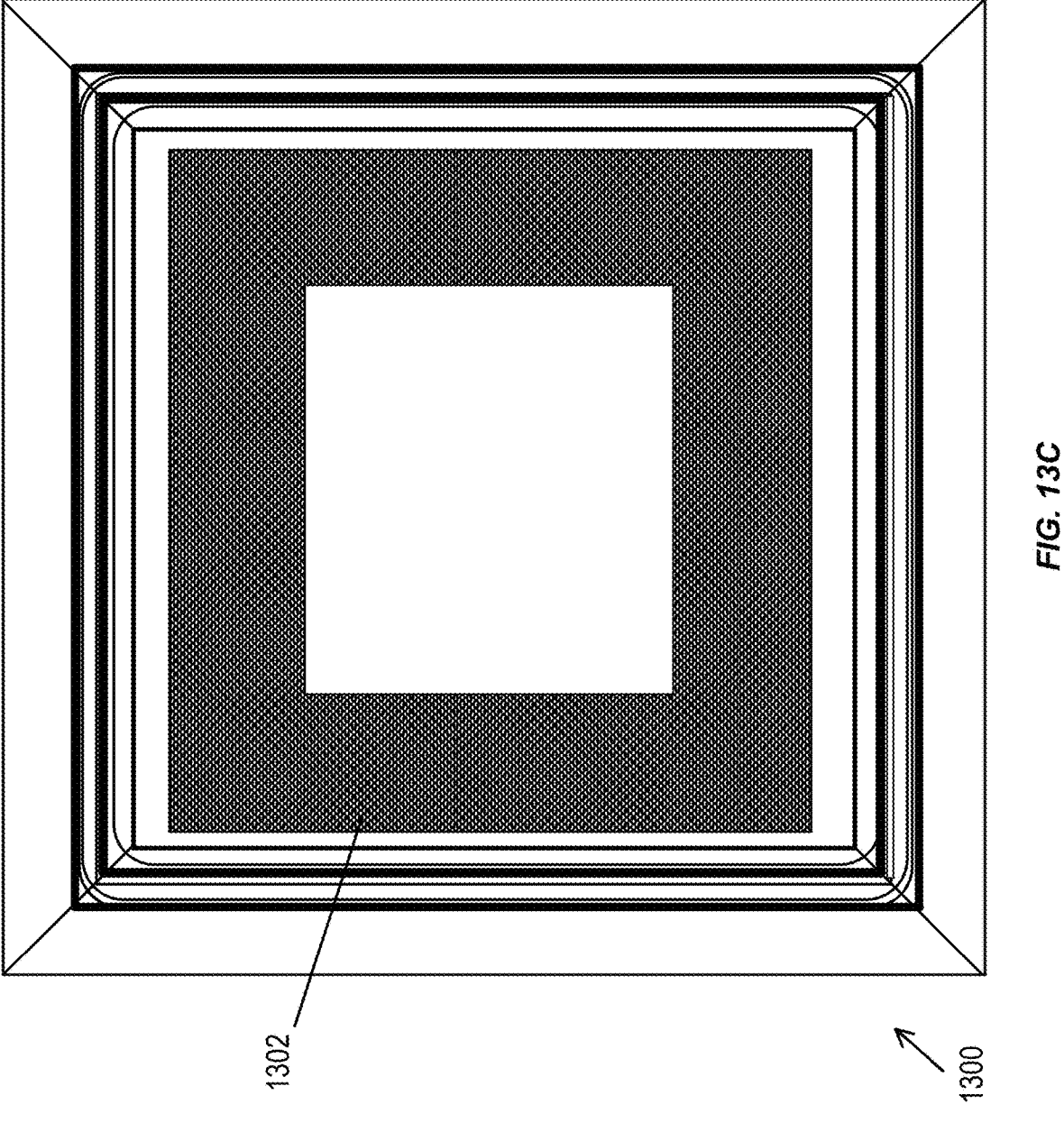
FIG. 13C is a top plan view of the skylight from FIG. 13A.
Figure 13D:
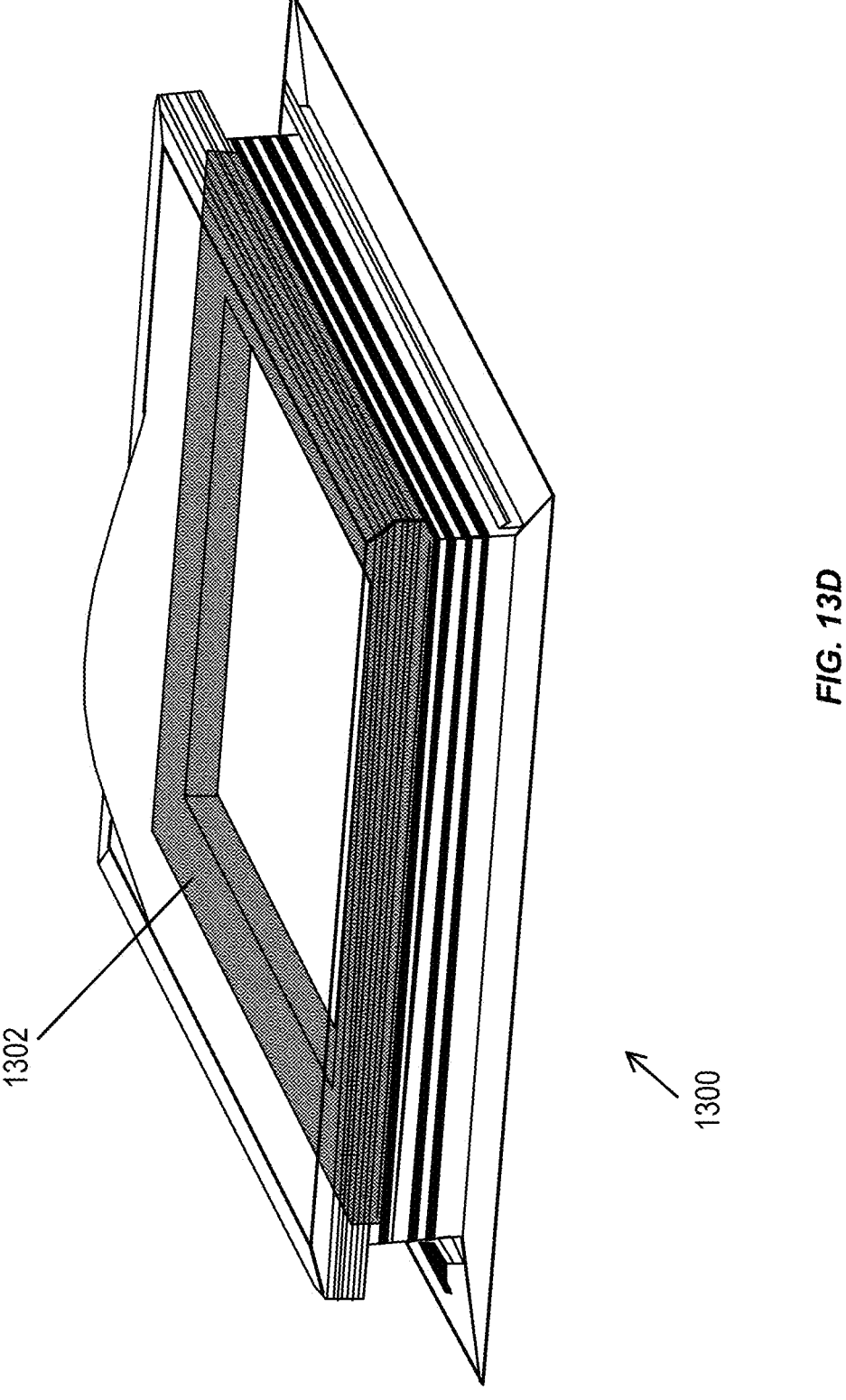
FIG. 13D is an isometric view of the skylight from FIG. 13A.

In some embodiments, all or a substantial portion of a skylight opening may be utilized for a solar power unit in order to capture more solar power, enabling a solar power unit to power larger and/or more devices. FIGS. 11A-11E illustrate an embodiment in which a skylight 1100 is primarily utilized to generate power using a solar power unit 1102. Here, the solar power unit 1102 extends across an entire opening of the skylight 1100 such that no outside light passes into the interior of a structure 1104. Instead, a larger solar panel and/or number of solar panels are included in the solar power unit 1102, which are protected by a skylight panel 1106 that extends above and covers the solar power unit 1102 as best illustrated in FIGS. 11C and 11D (although some embodiments may omit the skylight panel 1106). In such embodiments, the solar power unit 1102 is capable of supplying greater amounts of power to outlets, building lights, charging units, and/or power storage units positioned on or within the structure 1104. For example, as illustrated in FIG. 11E, the solar power unit 1102 may be electrically coupled with a charge controller 1108 and/or a power inverter 1110 to supply A/C current to one or more components, such as interior lights 1112, outlets 1114, battery storage units 1116, and/or other components.

FIGS. 12A-12E illustrate embodiments of skylights 1200 that have integrated solar power units 1202 that extend across an entire width of the skylight 1200 while leaving some space for light to enter a structure 1202 via the skylight 1200. As illustrated, the solar power units 1202 are positioned along a first side (here a top side) of the skylight 1200, leaving a remaining portion of the skylight 1200 unobstructed. While shown here with the solar power units 1202 being positioned along the top side of the skylight 1200, it will be appreciated that the solar power units 1202 may be positioned along the bottom side and/or in a medial area of the skylight 1200 (leaving unobstructed portions of the skylight 1200 on either side of the solar power units 1202. The solar power units 1202 may be any size or shape. In some embodiments, multiple solar power units 1202 may be positioned on one or more sides (adjacent sides, opposing sides, and/or other arrangement of sides) of the skylight 1200 and/or spaced apart along a width and/or length of the skylight 1200. Additionally, in some embodiments, rather than spanning an entire width and/or length of the skylight 1200, one or more solar power units 1202 may be positioned across only a portion of the width and/or length of the skylight 1200. As just one example, a smaller (no more than 25% of the area of the skylight 1200) square shaped solar power unit 1202 may be positioned in one or more corners (or other locations) of the skylight 1200.

In some embodiments, a skylight 1300 may include a solar power unit 1302 that forms a frame around a portion of an interior portion of the skylight 1300 as illustrated in FIGS. 13A-13D. For example, the solar power unit 1302 may be circular, rectangular, and/or otherwise completely border the interior portion of the skylight 1300, thereby allowing light to pass through the unobstructed interior portion. In some embodiments, the solar power unit 1302 may include an integrated power storage unit and one or more light sources 1304 that may be powered using the solar power unit 1302. As illustrated, the solar power unit 1302 has a number of light sources 1304 (such as LEDs) positioned along an underside of the frame like solar power unit 1302. Such designs create a particularly clean design without the need for external wiring for the light sources 1304, while still providing a uniformly shaped opening for natural light to pass through during periods of sunlight.

Figure 14A:
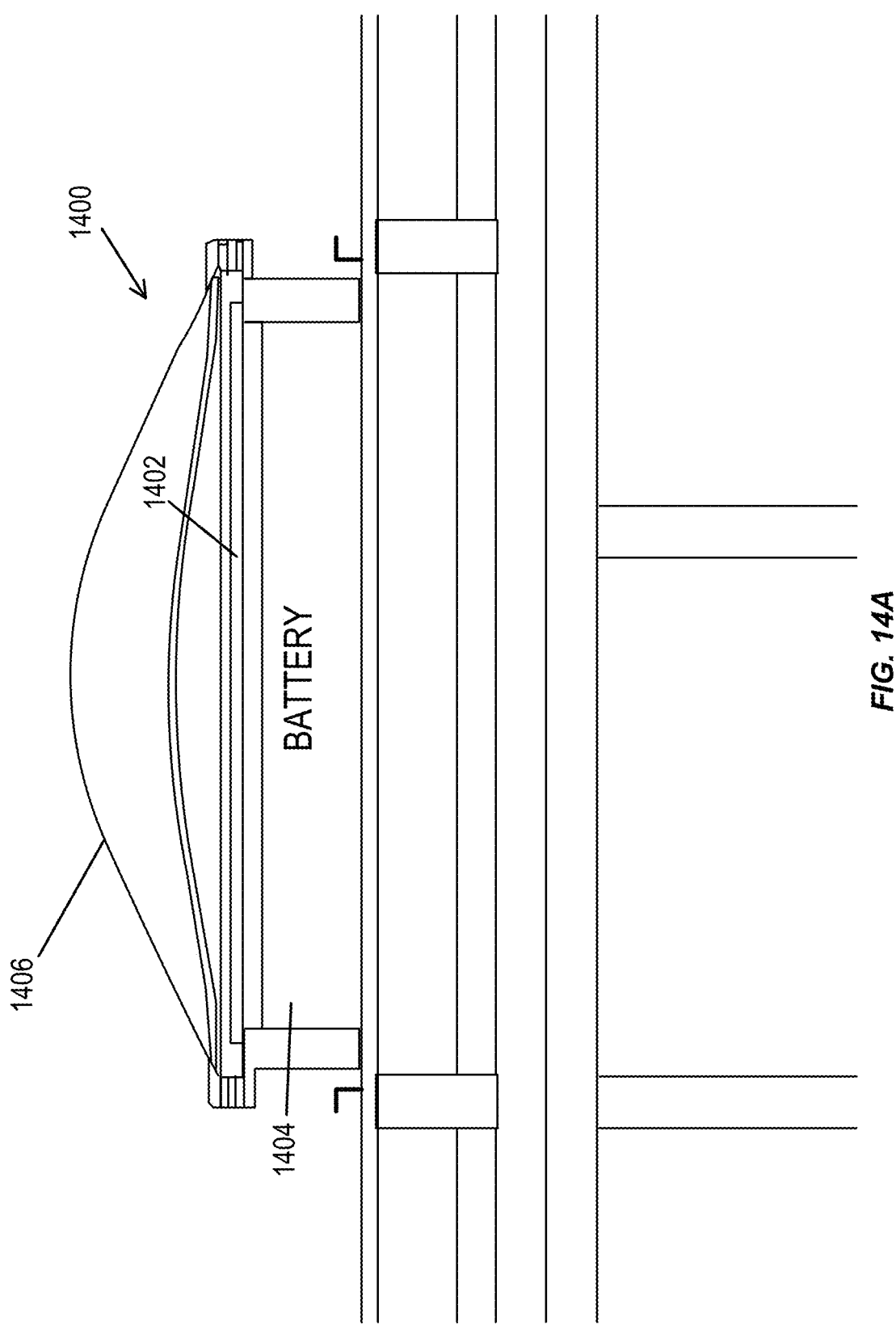
FIG. 14A is a cross-sectional side elevation view of a skylight having a solar power unit and an integrated battery storage unit.
Figure 14B:
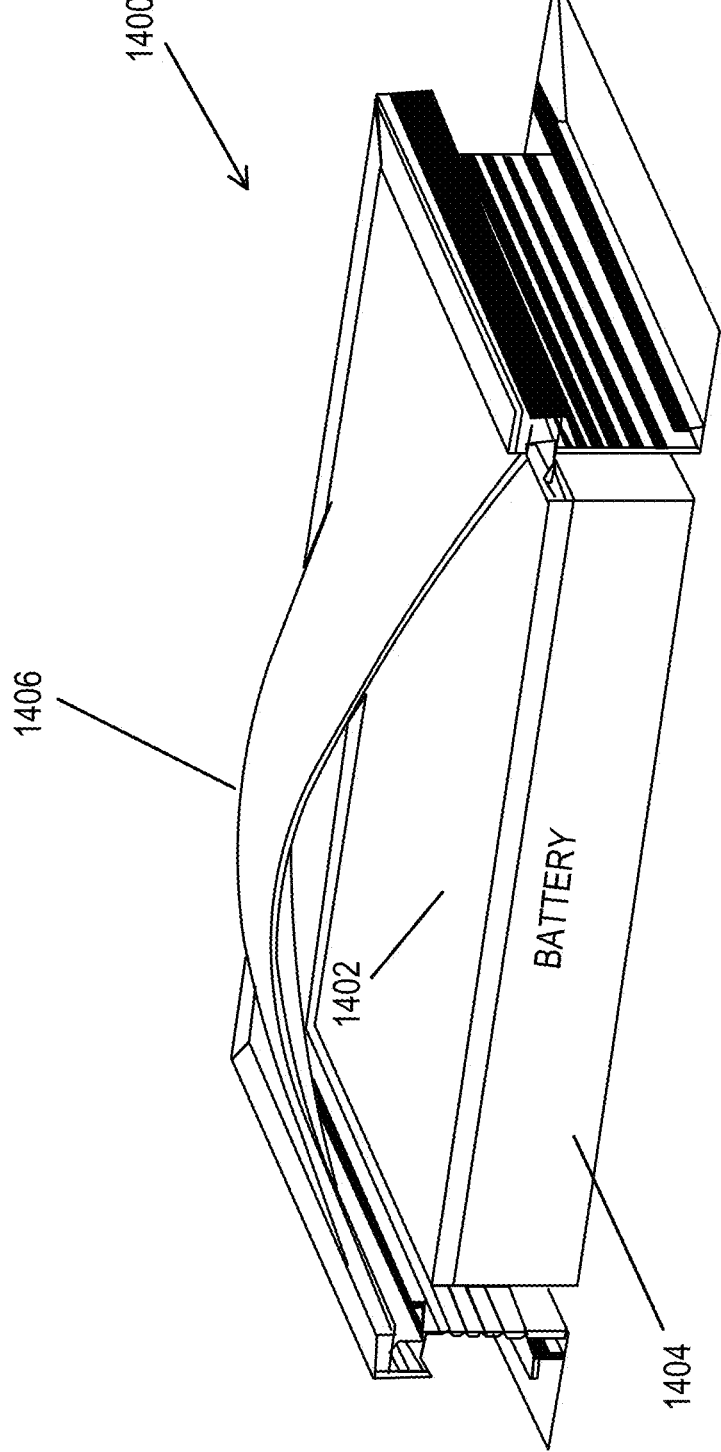
FIG. 14B is an isometric view of the skylight from FIG. 14A.

FIGS. 14A and 14B illustrate an embodiment in which a skylight 1400 may include a solar power unit 1402 that extends across all or part of the opening of the skylight 1400 and includes an integrated battery storage unit 1404. The battery storage unit 1404 is charged by the solar power unit 1402 and is then able to provide power to various equipment, such as (but not limited to) corded and/or cordless power tools, radios, lawn mower, trickle chargers for vehicles, lights, and/or other equipment. By placing the solar power unit 1402 and battery storage unit 1404 under a skylight panel 1406, the skylight 1400 may remain sealed and any wiring needed to couple the equipment with the solar power unit 1402 and battery storage unit 1404 may be maintained within the interior of the structure, without any need to drill holes through the skylight 1400, roof, and/or building envelope.

In some embodiments, the skylights designs described herein may be utilized in conjunction with semi and/or fully transparent solar cells. In such embodiments, the solar cells may be mounted to cover some or all of the central opening of the skylights, thereby allowing light in while the solar cells generate energy. In some embodiments, any circuitry and/or components of a solar power unit that are opaque may be positioned close to and/or integrated into the frame of the skylight.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C).

Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A skylight, comprising:

a frame that is configured to be mounted to a structure, the frame having at least one sidewall that defines a central opening, the central opening having a central axis extending through a first open end of the central opening and a second open end of the central opening;

a solar power unit that is coupled with the frame, wherein a face of a solar cell of the solar power unit is generally normal to the central axis and positioned to form a border about the central opening such that a central region of the central opening remains unobstructed by the solar power unit and enables light to pass through the central region of the central opening; and a skylight panel positioned above and covering the solar power unit.

2. The skylight of claim 1, further comprising:

an integrated power storage unit.

3. The skylight of claim 1, further comprising:

one or more light sources disposed on an underside of the skylight.

4. The skylight of claim 3, wherein:

the one or more light sources are disposed on an underside of the solar power unit.

5. The skylight of claim 1, wherein:

the one or more light sources form a border about the central region of the central opening.

6. The skylight of claim 1, wherein:

the one or more light sources are powered by the solar power unit.

7. The skylight of claim 1, wherein:

the solar cell is transparent to enable light to pass through a portion of the solar power unit that is disposed within the central opening.

8. A skylight, comprising:

a frame that is configured to be mounted to a structure, the frame having at least one sidewall that defines a central opening, the central opening having a central axis extending through a first open end of the central opening and a second open end of the central opening;

a solar power unit that is coupled with the frame, wherein a face of a solar cell of the solar power unit is generally normal to the central axis and positioned to form a border about at least a portion of the central opening such that a region of the central opening remains unobstructed by the solar power unit and enables light to pass through the region of the central opening; and a skylight panel positioned above and covering the solar power unit.

9. The skylight of claim 8, wherein:

the solar cell extends entirely across one or both of a length of the central opening and a width of the central opening.

10. The skylight of claim 8, wherein:

the solar cell extends only partially across one or both of a length of the central opening and a width of the central opening.

11. The skylight of claim 8, wherein:

the solar cell is disposed in a corner of the central opening.

12. The skylight of claim 8, wherein:

the solar cell comprises a first solar cell;

the solar power unit comprises a second solar cell; and each of the first solar cell and the second solar cell is positioned within a corner of the central opening.

13. The skylight of claim 8, wherein:

the solar cell comprises a first solar cell;

the solar power unit comprises a second solar cell, a third solar cell, and a fourth solar cell; and each of the first solar cell, the second solar cell, the third solar cell, and the fourth solar cell is positioned within a corner of the central opening.

14. The skylight of claim 8, wherein:

the solar cell is transparent to enable light to pass through a portion of the solar power unit that is disposed within the central opening.

15. A skylight, comprising:

a frame that is configured to be mounted to a structure, the frame having at least one sidewall that defines a central opening, the central opening having a central axis extending through a first open end of the central opening and a second open end of the central opening;

a solar power unit that is coupled with the frame, wherein a face of a solar cell of the solar power unit is generally normal to the central axis and positioned to extend across at least a portion of the central opening, wherein the solar cell is transparent; and a skylight panel positioned above and covering the solar power unit.

16. The skylight of claim 15, wherein:

the solar cell is configured to enable light to pass through a portion of the solar power unit that is disposed within the central opening while the solar cell generate energy.

17. The skylight of claim 15, wherein:

the solar cell extends across an entirety of the central opening.

18. The skylight of claim 15, wherein:

circuitry of the solar power unit is disposed within the frame.

19. The skylight of claim 15, wherein:

circuitry of the solar power unit is disposed within an edge portion of the solar cell proximate the frame.

20. The skylight of claim 15, wherein:

the solar cell forms a border extending about a central region of the central opening.

\*　　\*　　\*　　\*　　\*